US012706235B2

(12) United States Patent
Yahata et al.

(10) Patent No.: US 12,706,235 B2
(45) Date of Patent: Aug. 11, 2026

(54) THERMALLY STABLE, CLADDED PERMANENT MAGNETS, AND COMPOSITIONS AND METHODS FOR MAKING THE SAME

(71) Applicant: HRL Laboratories, LLC, Malibu, CA (US)

(72) Inventors: Brennan Yahata, Santa Barbara, CA (US); Adam Gross, Santa Monica, CA (US); Christopher Henry, Thousand Oaks, CA (US); Darby Laplant, Ventura, CA (US); Amber Sucich, Calabasas, CA (US); Raymond Nguyen, Anaheim, CA (US); Christine Kim, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 780 days.

(21) Appl. No.: 18/114,199

(22) Filed: Feb. 24, 2023

(65) Prior Publication Data

US 2023/0282398 A1 Sep. 7, 2023

Related U.S. Application Data

(60) Provisional application No. 63/317,100, filed on Mar. 7, 2022.

(51) Int. Cl.

| | |
|---|---|
| ***H01F 1/055*** | (2006.01) |
| ***B82Y 25/00*** | (2011.01) |
| ***B82Y 40/00*** | (2011.01) |
| ***H01F 1/00*** | (2006.01) |
| ***H01F 1/06*** | (2006.01) |
| ***H01F 1/09*** | (2006.01) |
| ***H01F 1/34*** | (2006.01) |
| ***H01F 1/36*** | (2006.01) |
| ***H01F 7/02*** | (2006.01) |
| ***H01F 41/02*** | (2006.01) |

(52) U.S. Cl.

CPC ......... *H01F 1/0551* (2013.01); *H01F 1/0045* (2013.01); *H01F 1/06* (2013.01); *H01F 1/09* (2013.01); *H01F 1/344* (2013.01); *H01F 1/36* (2013.01); *H01F 7/021* (2013.01); *H01F 7/0221* (2013.01); *B82Y 25/00* (2013.01); *B82Y 40/00* (2013.01); *H01F 41/0253* (2013.01)

(58) Field of Classification Search

CPC .. H01F 41/0253; H01F 1/0551; H01F 1/0571; H01F 1/0045; H01F 1/06; H01F 1/09; H01F 1/36; H01F 1/344

See application file for complete search history.

(56) References Cited

U.S. PATENT DOCUMENTS

| | | | | |
|---|---|---|---|---|
| 10,014,099 | B2 | 7/2018 | Chen et al. | |
| 11,219,919 | B1 | 1/2022 | Cui et al. | |
| 2016/0379741 | A1 | 12/2016 | Allard, Jr. et al. | |
| 2017/0154713 | A1 | 6/2017 | Simon et al. | |
| 2018/0214949 | A1 * | 8/2018 | Martin | B22F 5/12 |
| 2019/0027306 | A1 | 1/2019 | Peng et al. | |
| 2021/0146439 | A1 | 5/2021 | Hundley et al. | |
| 2022/0044851 | A1 | 2/2022 | Yahata et al. | |
| 2022/0044870 | A1 * | 2/2022 | Yahata | H01F 41/0253 |

FOREIGN PATENT DOCUMENTS

EP 3940720 A1 1/2022

OTHER PUBLICATIONS

Chang et al., "Influences of Laser Spot Welding on Magnetic Property of a Sintered NdFeB Magnet", Metals 2016, 6, 202.

Dulis et al., "Solid NdFeB Magnets Made by Gas Atomization and Extrusion", Science and Technology of Nanostructured Magnetic Materials, 1991, pp. 599-600.

White et al., "Net shape processing of alnico magnets by additive manufacturing", IEEE Transactions on Magnetics, 53.11 (2017): 1-6.

Ma et al., "The impact ofthe directional solidification on the magnetic properties of NdFeB magnets", Journal of Applied Physics 70 (1991): 6471-6473.

Kolb et al., "Laser Beam Melting of NdFeB forthe production of rare-earth magnets", 2016 6th International Electric Drives Production Conference (EDPC), IEEE, 2016.

Jacimovic et al., "Net shape 3D printed NdFeB permanent magnet", preprint arXiv:1611.05332 [physics.ins-det] (2016).

Wang et al., "Effect of External Magnetic Field on the Microstructure of 316L Stainless Steel Fabricated by Directed Energy Deposition", Proceedings of the ASME 2019 International Mechanical Engineering Congress and Exposition, vol. 2B: Advanced Manufacturing (2019), abstract.

(Continued)

*Primary Examiner* — C Melissa Koslow

(74) *Attorney, Agent, or Firm* — O'Connor & Company; Ryan P. O'Connor

(57) ABSTRACT

The disclosed technology provides a nanofunctionalized magnetic material feedstock comprising: from 50 wt % to 99.5 wt % of magnetic microparticles having an average microparticle effective diameter from 1 micron to 500 microns; from 0.4 wt % to 40 wt % of one or more rare earth elements; and from 0.1 wt % to 10 wt % of metal-containing grain-refining nanoparticles, wherein at least 1 wt % of the grain-refining nanoparticles are chemically and/or physically disposed on surfaces of the magnetic microparticles. The nanofunctionalized magnetic material feedstock is processed using high-throughput laser-based additive manufacturing to optimize the architecture of NdFeB or other magnets, generating site-specific, demagnetization-resistant microstructures. This disclosure teaches a rapid, single-step laser-based process to tailor the easy axis alignment, grain size, and microstructure of a permanent magnet at corners and edges to resist demagnetization.

25 Claims, 21 Drawing Sheets
(11 of 21 Drawing Sheet(s) Filed in Color)

(56) References Cited

OTHER PUBLICATIONS

Castle et al., "High coercivity, anisotropic, heavy rare earth-free Nd—Fe—B by Flash Spark Plasma Sintering", Scientific Reports, 7, 2017.

McCurrie, "Determination of the degree of easy axis alignment in uniaxial permanent magnets from remanence measurements" Journal of Applied Physics 52, 7344, 1981.

* cited by examiner

AM Stock NdFeB (2020)

9.0 µm

Unmodified

AM NdFeB + ZrB2 (2021)

1.8 μm

Nanofunctionalized

THERMALLY STABLE, CLADDED PERMANENT MAGNETS, AND COMPOSITIONS AND METHODS FOR MAKING THE SAME

PRIORITY DATA

This patent application is a non-provisional application claiming priority to U.S. Provisional Patent App. No. 63/317,100, filed on Mar. 7, 2022, which is hereby incorporated by reference herein.

FIELD OF THE INVENTION

The present invention generally relates to permanent magnets with tailored magnetic and thermal properties.

BACKGROUND OF THE INVENTION

A magnet is a material or object that produces a magnetic field. The magnetic field creates a force that acts on other magnets or ferromagnetic materials, such as iron, nickel, or cobalt. A permanent magnet is an object made from a material that is magnetized and creates its own persistent magnetic field. A "permanent magnet" (or "hard magnet") means a magnet with an intrinsic magnetic coercivity of 1000 A/m (amperes per meter) or greater.

Although ferromagnetic and ferrimagnetic materials are the only materials attracted to a magnet strongly enough to be commonly considered magnetic, all substances respond at least weakly to a magnetic field. Some ferromagnetic materials are magnetically soft materials ("soft magnets") such as annealed iron. Soft magnets can be magnetized but do not tend to stay magnetized. On the other hand, magnetically hard materials ("hard magnets") tend to stay magnetized and are typically difficult to demagnetize. Permanent magnets are commonly made from hard ferromagnetic materials that are subjected to special processing in a strong magnetic field during manufacture to align the internal microcrystalline structure, making the materials very hard to demagnetize. Demagnetizing a saturated magnet requires application of a magnetic field whose minimum strength correlates with the magnetic coercivity of the magnet. Hard magnets have high magnetic coercivity, while soft magnets have relatively low magnetic coercivity.

Permanent magnets are commonly made from neodymium (Nd), iron (Fe), and boron (B), known as neodymium magnets; Al—Ni—Co alloys; or ferrites (e.g., $Fe_3O_4$). Neodymium magnets are the strongest and most expensive of the three materials. Strong permanent magnets—especially sintered Nd magnets—have had their magnetic domains oriented in the direction of an easy axis to maximize magnetic strength. That is, the magnetic domains are aligned along the same crystalline axis to make each domain have the same easy-axis alignment and maximize coercivity of the bulk magnet.

Applications of permanent magnets include, but are not limited to, electric vehicle motors, electric take-off assist motors, electric generators, sensors, actuators, magnetic separators, and magnetic detectors.

Transportation creates enormous $CO_2$ emissions globally. Electrification has the potential to reduce annual well-to-wheel emissions by 60-80% if every gasoline car is replaced by an electric vehicle. Increasing the adoption of electrified transportation can thus be an effective means of reaching the goal of 50% reduction of United States greenhouse gases by 2030. Widespread adoption of electric vehicles is currently hindered by their limited range and high cost. There is thus a strong desire to increase range and decrease cost of electric ground vehicles. Motors with higher energy density are also desired for emerging electric air-mobility applications.

Permanent magnet motors are more efficient, lighter, smaller, and require less cooling than induction motors. Permanent magnets therefore can improve the overall vehicle energy efficiency. However, motor performance is currently limited by vulnerability to permanent demagnetization at elevated temperatures, reducing motor torque output and energy efficiency.

During permanent-magnet motor operation, eddy currents are a primary source of Joule heating. At typical operating temperatures of 150-200° C., standard NdFeB magnets are prone to degradation. This degradation occurs through localized, incremental, magnetic domain reversal (demagnetization) from a combination of high applied magnetic fields, as well as reduced coercivity (large, negative temperature coefficient) at elevated temperatures. Once the magnetic domain alignment is reversed, the energy product $(BH)_{max}$—and hence motor power density—is reduced and cannot be restored. This degradation phenomenon reduces the torque of a motor and leads to partial demagnetization at about 150° C. during motor operation. This partial demagnetization has been shown to require approximately 10% greater energy input per unit distance versus a fully magnetized motor. Therefore, prevention of localized demagnetization is a strong desire for improved electric motor efficiency and electric vehicle range.

State-of-the art bulk permanent magnets are conventionally produced by die-press and sintering methods in which consolidation of powder precursors followed by heat treatment in a magnetic field produces a magnetic and crystallographic alignment in one specific orientation throughout the magnet. Die-press and sintering methods are inherently limited in possible geometries by the shape of the die (prismatic geometry) and eventual loss of net shape due to a shrinkage during sintering. Additionally, the mass loss costs incurred by machining into a final net shape significantly increase the cost of magnets. For example, magnet material cost is about 70% of an electric motor and is a primary limiting factor to wide-scale adoption of electric-motor automotive vehicles powered by permanent-magnet motors. Material cost of rare-earth permanent-magnet materials, required for high-performance automotive and aerospace platforms, is a substantial commercial problem today.

Permanent magnets can be optimized by locally tailoring crystallographic texture in regions susceptible to demagnetization by tailoring the orientation of the easy axis. Conventionally processed high-performing permanent magnets produce a single, or narrow distribution of, easy axis orientations and magnetizations. Permanent magnets with this anisotropic crystallographic texture (e.g., die-pressed NdFeB or directionally solidified AlNiCo or FeCoCr) demonstrate desirable magnetic performance, such as magnetic energy density, in comparison to isotropic variants. These anisotropic materials are conventionally produced by die compaction where consolidation of powder precursors produces a uniform texture, a result of directionally imposed plastic deformation, throughout the material. The nearly uniform orientation of the crystal structure aligns the easy axis of each grain, thereby allowing the material to be magnetized in a single orientation with a narrow distribution, producing larger achievable magnetizations. However, in many applications such as electric motors, generated magnetic fields interact non-uniformly with these magnetic materials. Because fields generated in these applications are non-uniformly concentrated in regions of high and low magnetic flux density to maximize motor efficiencies, regions such as corners, edges, and surfaces of the permanent magnet material are more susceptible to demagnetization than the interior bulk. The magnetic field angle of incidence in these regions can vary significantly away from the angles producing maximal torque and lead to demagnetization under weaker applied fields-thus limiting the achievable weight and volume efficiencies of the magnetic material. State-of-the-art manufacturing die-press and sinter methods are significantly constrained to uniaxial textures and, as mentioned above, prismatic geometries. Many desirable textures and magnetic shapes are not possible using the known art.

It would be desirable to impose different magnetic orientations at specific locations within a magnet, to augment the capability of tailoring a magnetic field. For instance, field strength could be increased on one side of a magnet while cancelling the field to near zero on the other side of the magnet, using arrays of magnetic orientations in different directions. These types of designs are typically assembled by bonding magnets together, in a structure known as a Halbach array. More generally, location-specific magnetic orientations would be beneficial because the shape and intensity of the magnetic field generated by a permanent magnet could be designed into the magnet architecture without physically changing the shape of the magnet.

When there is no preferential direction for an object's magnetic moment, the object will respond to an applied magnetic field in the same way, regardless of which direction the field is applied. This is known as magnetic isotropy. In contrast, magnetically anisotropic materials will be easier or harder to magnetize depending on which way the object is rotated. For many magnetically anisotropic materials, there are at least two easiest directions to magnetize the material, which are a 180° rotation apart. The line parallel to these directions is called the magnetic easy axis and is an energetically favorable direction of spontaneous magnetization.

Magnetocrystalline anisotropy has a great influence on industrial uses of ferromagnetic materials. Materials with high magnetic anisotropy usually have high magnetic coercivity—that is, they are hard to demagnetize. These are called hard ferromagnetic materials and are used to make permanent magnets. For example, the high anisotropy of rare-earth metals is mainly responsible for the strength of rare-earth magnets. During manufacture of magnets, a powerful magnetic field aligns the microcrystalline grains of the metal such that their easy axes of magnetization all point in the same direction, freezing a strong magnetic field into the material.

Nearly uniform orientation of a crystal structure aligns the easy axis of each grain, allowing the material to be easily magnetized with a small orientation distribution and giving the material a high resistance to uniform demagnetizing fields. Resistance to demagnetization has been increased in the art by manipulating process-dependent microstructure and chemistry to optimize competing mechanisms in generating high-energy products. However, in applications such as electric motors, generated magnetic fields interact non-uniformly with magnetic materials. Because fields generated are non-uniformly concentrated to regions of high and low magnetic flux density, regions such as corners and surfaces of the magnet are highly susceptible to demagnetization. In addition, the corners are inherently susceptible to demagnetization even with uniform flux, due to the magnet geometry and microstructure. The magnetic field angle of incidence in these regions can vary significantly away from the angles producing maximal torque and lead to demagnetization, thereby limiting the achievable weight and volume efficiencies of the magnetic material.

State-of-the-art bulk permanent magnet materials (e.g. NdFeB) with anisotropic crystallographic texture have desirable magnetic performance in comparison to isotropic variants. Anisotropic materials are conventionally produced by die-press and sintering methods in which consolidation of powder precursors produces a relatively uniform texture throughout the material. Heat treatment in a magnetic field then produces relatively uniform magnetic alignment of all grains in the material. The die-press and sinter methods are significantly constrained to prismatic geometries and uniaxial textures, and therefore limited in their ability to achieve desirable crystallographic textures and magnetic shapes.

The benefits of easy axis alignment through texturing in permanent magnets are well-known. See Dulis et al., "Solid NdFeB Magnets Made by Gas Atomization and Extrusion", *Science and Technology of Nanostructured Magnetic Materials,* 1991, pages 599-606; and White et al., "Net shape processing of alnico magnets by additive manufacturing", IEEE Transactions on Magnetics, 53.11 (2017): 1-6. Some methods of texture control in NdFeB are based on plastic deformation of a consolidated material. In this technique, the crystallographic orientation is largely uniform in the extrusion direction (e.g. c-axis for NdFeB permanent magnets) with limited ability to control the texture in orientations other than the direction of plastic deformation. Directional solidification is alternatively used to produce uniaxial texture, but texture in these methods is uniaxial and dependent on the maximum thermal gradient. Directional solidification is severely limited in two ways. First, texture in the preferred growth direction, in the case of NdFeB, produces a preferred growth orientation [100] orthogonal to the easy axis direction which is the [001]c-axis in NdFeB. Second, these methods produce long columnar grains well above the single-domain limit for these materials, thus limiting the achievable coercivity. See Ma et al., "The impact of the directional solidification on the magnetic properties of NdFeB magnets", *Journal of Applied Physics* 70 (1991): 6471-6473.

Current methods to additively manufacture permanent magnets are limited to those easily processible by liquid-processing methods and very limited in achievable performance for higher-energy-product NdFeB materials where microstructures are heavily optimized for die-press methods. See Kolb et al., "Laser Beam Melting of NdFeB for the production of rare-earth magnets", 2016 *6th International Electric Drives Production Conference* (*EDPC*), IEEE, 2016 and Jacimovic et al., "Net shape 3D printed NdFeB permanent magnet", preprint arXiv:1611.05332 [physics.ins-det](2016).

Control of crystallographic texture in directed energy deposition (DED) manufacturing using external magnetic fields to alter crystal texture in structural alloys has been described in academic studies. See Wang et al., "Texture control of Inconel 718 superalloy in laser additive manufacturing by an external magnetic field", *Journal of Materials Science* 54.13 (2019): 9809-9823; and Wang et al., "Effect of External Magnetic Field on the Microstructure of 316L Stainless Steel Fabricated by Directed Energy Deposition", *Proceedings of the ASME* 2019 *International Mechanical Engineering Congress and Exposition, Volume 2B: Advanced Manufacturing* (2019). While DED using powder spray or wires produces parts with less geometric constraints than traditional methods, these parts usually need extensive finishing procedures due to a poor surface finish after deposition has occurred. This is in contrast to powder bed-based processes which can produce near-net-shape parts after deposition.

The current methods are inherently limited to microstructures conventionally achieved in the unique thermoprocessing conditions of additive manufacturing (columnar grains >100 μm), which limits the magnetic performance of additively manufactured materials. In addition, current additive-manufacturing methods to produce hard magnetic materials are limited to materials with low-energy products (<50 $kJ/m^3$). State-of-art NdFeB magnet materials can have energy products >400 $kJ/m^3$, employing conventional processing methods that lack texture control.

In view of the many aforementioned problems known in the prior art, improved magnet structures and starting compositions are very much desired.

SUMMARY OF THE INVENTION

The present invention addresses the aforementioned needs in the art, as will now be summarized and then further described in detail below.

Some variations provide a nanofunctionalized magnetic material feedstock comprising:

(a) from about 50 wt % to about 99.5 wt % of magnetic microparticles having an average microparticle effective diameter from about 1 micron to about 500 microns;

(b) from about 0.4 wt % to about 40 wt % of one or more rare earth elements; and (c) from about 0.1 wt % to about 10 wt % of metal-containing grain-refining nanoparticles having an average nanoparticle effective diameter from about 1 nanometer to about 1000 nanometers, wherein at least 1 wt % of the metal-containing grain-refining nanoparticles are chemically and/or physically disposed on surfaces of the magnetic microparticles.

In some embodiments, the magnetic microparticles are a magnetic material selected from the group consisting of NdFeB, DyFeB, SmCo, AlNiCo, MnAl, FeN, $Fe_3O_4$, and combinations thereof.

In some embodiments, the magnetic microparticles are substantially spherical. In other embodiments, the magnetic microparticles are non-spherical.

The average microparticle effective diameter may be about 100 microns or less. In certain embodiments, the average microparticle effective diameter is about 10 microns or less.

The average nanoparticle effective diameter may be about 100 nanometers or less. In certain embodiments, the average nanoparticle effective diameter is about 10 nanometers or less.

In various embodiments, at least 10 wt % of the metal-containing grain-refining nanoparticles are chemically and/or physically disposed on surfaces of the magnetic microparticles. In some embodiments, at least 50 wt % of the metal-containing grain-refining nanoparticles are chemically and/or physically disposed on surfaces of the magnetic microparticles. In certain embodiments, essentially all of the metal-containing grain-refining nanoparticles are chemically and/or physically disposed on surfaces of the magnetic microparticles.

The metal-containing grain-refining nanoparticles may form a continuous coating on the magnetic microparticles. Alternatively, the metal-containing grain-refining nanoparticles may form a discontinuous coating on the magnetic microparticles. The discontinuous coating may have a surface coverage from about 1% to about 99%, such as from about 10% to about 50%, on the magnetic microparticles.

In some embodiments, the nanofunctionalized magnetic material feedstock comprises at least about 1 wt % of the metal-containing grain-refining nanoparticles. In certain embodiments, the nanofunctionalized magnetic material feedstock comprises at least about 5 wt % of the metal-containing grain-refining nanoparticles.

The one or more rare earth elements may be selected from the group consisting of Dy, Pr, Tb, Ce, and Nd. Other rare earth metals may be used. The one or more rare earth elements, in part (b) of the nanofunctionalized magnetic material feedstock, are distinct from any rare earth elements that may be present in the base magnetic microparticles. For example, when the base magnetic microparticles in part (a) of the nanofunctionalized magnetic material feedstock are made from neodymium-iron-boron alloy $Nd_2Fe_{14}B$, the neodymium content in that alloy is not counted toward the 0.4-40 wt % concentration of rare earth elements in part (b).

In some embodiments, one or more rare earth elements are alloyed with Cu in the form of a eutectic mixture, which has a melting point lower than either Cu or the rare earth element(s) in the eutectic mixture. One example is a low-melting-point Dy—Cu eutectic alloy. Another example is a low-melting-point Pr—Cu eutectic alloy. The Cu is not counted toward the concentration of the one or more rare earth elements in the nanofunctionalized magnetic material feedstock. That is, the nanofunctionalized magnetic material feedstock contains from about 0.4 wt % to about 40 wt % of the rare earth element(s), whether or not those rare earth elements are in the form of a eutectic mixture. The 0.4-40 wt % concentration is not referring to the concentration of rare earth metals within the eutectic mixture itself.

In some embodiments, the metal-containing grain-refining nanoparticles are a zirconium-containing material selected from Zr, ZrC, $ZrB_2$, $ZrH_2$, $ZrO_2$, $Zr_2O_3$, or a combination thereof. In certain embodiments, the zirconium-containing material is ZrC, $ZrB_2$, or a combination of ZrC and $ZrB_2$.

In some embodiments, the nanofunctionalized magnetic material feedstock further comprises a magnetic nanomaterial selected from the group consisting of NdFeB, DyFeB, SmCo, AlNiCo, MnAl, FeN, $Fe_3O_4$, and combinations thereof. The magnetic nanomaterial is distinct from the base magnetic microparticles in part (a) of the nanofunctionalized magnetic material feedstock.

In some embodiments, the nanofunctionalized magnetic material feedstock further comprises a grain-growth-restriction agent selected from Cu, B, or a combination thereof. The grain-growth-restriction agent is distinct from any copper or boron that may be present in the magnetic microparticles (e.g., boron in $Nd_2Fe_{14}B$) or in grain-refining nanoparticles (e.g., boron in $ZrB_2$).

In some embodiments, the nanofunctionalized magnetic material feedstock further comprises a grain-boundary modifier selected from the group consisting of $Dy_2O_3$, Cu, Nd, and combinations thereof. The grain-boundary modifier is distinct from any material that may be present in the magnetic microparticles (e.g., neodymium in $Nd_2Fe_{14}B$) or in rare earth elements (e.g., dysprosium in $Dy_2O_3$).

In some embodiments, the nanofunctionalized magnetic material feedstock further comprises an electrical-resistivity modifier selected from the group consisting of $Dy_2O_3$, $Al_2O_3$, $Zr_2O_3$, $ZrO_2$, $Y_2O_3$, $Ce_2O_3$, $CeO_2$, AlN, $SiO_2$, $TiB_2$, TiC, $ZrB_2$, ZrC, and combinations thereof. The electrical-resistivity modifier is distinct from the magnetic microparticles, the rare earth elements, and the grain-refining nanoparticles.

The nanofunctionalized magnetic material feedstock may further contain one or more additives, which may be used for various reasons.

Other variations provide a cladded permanent magnet comprising:

(a) a core magnet region containing a core magnetic material; and (b) a magnet cladding containing a shell magnetic material, wherein the shell magnetic material comprises (i) a magnetic compound that is chemically the same as the core magnetic material, (ii) one or more rare earth elements, and (iii) metal-containing grain-refining nanoparticles, wherein the magnet cladding is disposed on the core magnet region, wherein the magnet cladding is chemically distinct and physically distinct from the core magnet region, and wherein the magnet cladding has at least 10% higher ambient-temperature magnetic coercivity compared to the core magnet region, wherein the ambient-temperature magnetic coercivity is measured at 25° C.

In some embodiments, the magnet cladding has at least 50% higher ambient-temperature magnetic coercivity compared to the core magnet region.

The cladded permanent magnet may also have improved magnetic coercivity at elevated temperatures. In some embodiments, the magnet cladding has at least 10% higher elevated-temperature magnetic coercivity compared to the core magnet region, wherein the elevated-temperature magnetic coercivity is measured at 150° C. In certain embodiments, the magnet cladding has at least 50% higher elevated-temperature magnetic coercivity compared to the core magnet region.

In some cladded permanent magnets, the core magnetic material is selected from the group consisting of NdFeB, DyFeB, SmCo, AlNiCo, MnAl, FeN, $Fe_3O_4$, and combinations thereof.

In some cladded permanent magnets, one or more rare earth elements are selected from the group consisting of Dy, Tb, Pr, Ce, and Nd. In certain embodiments, one or more rare earth elements are alloyed with Cu in the form of a eutectic mixture, such as Dy—Cu and/or Pr—Cu.

In some cladded permanent magnets, the metal-containing grain-refining nanoparticles are selected from the group consisting of Zr, ZrC, $ZrB_2$, $ZrH_2$, $ZrO_2$, $Zr_2O_3$, and combinations thereof.

The magnet cladding may be a continuous cladding that forms a shell on all surfaces surrounding the core magnet region. Alternatively, the magnet cladding may be a discontinuous cladding.

A discontinuous cladding may be disposed on one or more edges of the core magnet region. The one or more edges may include a trailing edge of an electric motor, for example. Alternatively, or additionally, a discontinuous cladding may be disposed at one or more corners of the core magnet region. Alternatively, or additionally, a discontinuous cladding may be disposed in one or more vertices within the core magnet region. A discontinuous cladding may form a pattern on the core magnet region. The pattern may be checkered, graded, circular, or another pattern, which may be relatively simple or complex (such as via detailed magnet simulation software).

The core magnet region may itself contain rare earth elements. The magnet cladding typically has a higher concentration of one or more rare earth elements compared to the core magnet region.

In various embodiments, the one or more rare earth elements are present in the magnet cladding at an average concentration from about 0.1 wt % to about 50 wt %, such as from about 1 wt % to about 25 wt %. In some embodiments, the one or more rare earth elements are uniformly distributed and concentrated within the magnet cladding. In other embodiments, the one or more rare earth elements have a graded concentration within the magnet cladding. For example, the one or more rare earth elements may be at a maximum concentration at an outer surface of the magnet cladding, and at a minimum concentration at an inner surface of the magnet cladding, where here minimum refers to the concentration in the magnet cladding. The inner surfaces face the core magnet region, which may have a non-zero concentration of rare earth elements. In certain embodiments, the one or more rare earth elements have a non-uniform and pre-programmed concentration within the magnet cladding.

In some cladded permanent magnets, the shell magnetic material is distributed anisotropically in density and depth across the cladded permanent magnet.

The magnet cladding may be produced by solidifying a melt pool containing a molten form of one or more rare earth elements and a molten form of the core magnetic material.

In some embodiments, the shell magnetic material is preferentially located at grain boundaries within the magnet cladding. In some embodiments, the shell magnetic material is preferentially located within grains within the magnet cladding. Grains may be solidified grains from additive manufacturing or welding, for example. The grains may be equiaxed grains, nucleated by the grain-refining nanoparticles. The grains may have a magnetic easy axis that is dictated by a crystallographic texture of the grains. The grains may contain a high-energy-product material surrounded by a thermally stable shell material.

In some embodiments, the magnet cladding is thermally characterized by a magnetic coercivity at 180° C. of at least 4000 Oe.

The magnet cladding may be formed from laser-based additive manufacturing on the core magnet region. The magnet cladding may be formed from laser welding on the core magnet region.

In some embodiments, the magnet cladding forms a scalloped pattern on the core magnet region.

The cladded permanent magnet may have a curved shape or a prismatic shape, for example. The cladded permanent magnet may be fabricated to have any shape.

In typical embodiments, the cladded permanent magnet is placed in, or fabricated as a component of, an electric motor.

Some variations provide a method of making a cladded permanent magnet, the method comprising:

(i) providing a nanofunctionalized magnetic material feedstock comprising:

(i)(a) from about 50 wt % to about 99.5 wt % of magnetic microparticles having an average microparticle effective diameter from about 1 micron to about 500 microns;

(i)(b) from about 0.4 wt % to about 40 wt % of one or more rare earth elements; and (i)(c) from about 0.1 wt % to about 10 wt % of metal-containing grain-refining nanoparticles having an average nanoparticle effective diameter from about 1 nanometer to about 1000 nanometers, wherein at least 1 wt % of the metal-containing grain-refining nanoparticles are chemically and/or physically disposed on surfaces of the magnetic microparticles; and (ii) additively manufacturing or otherwise processing the nanofunctionalized magnetic material feedstock to form a cladded permanent magnet comprising:

(ii)(a) a core magnet region containing a core magnetic material; and (ii)(b) a magnet cladding containing a shell magnetic material, wherein the shell magnetic material comprises a magnetic compound that is chemically the same as the core magnetic material, one or more rare earth elements, and metal-containing grain-refining nanoparticles, wherein the magnet cladding is disposed on the core magnet region, wherein the magnet cladding is chemically distinct and physically distinct from the core magnet region, and wherein the magnet cladding has at least 10% higher ambient-temperature magnetic coercivity compared to the core magnet region, wherein the ambient-temperature magnetic coercivity is measured at 25° C.

In some methods, during step (ii), a magnetic field is applied to orient the easy axis of grains during solidification. Microseconds-long melting and solidification of small volumes occur consecutively, focusing the laser beam on different edges and corners while changing the applied magnetic field, to tailor the easy axis orientation.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1:
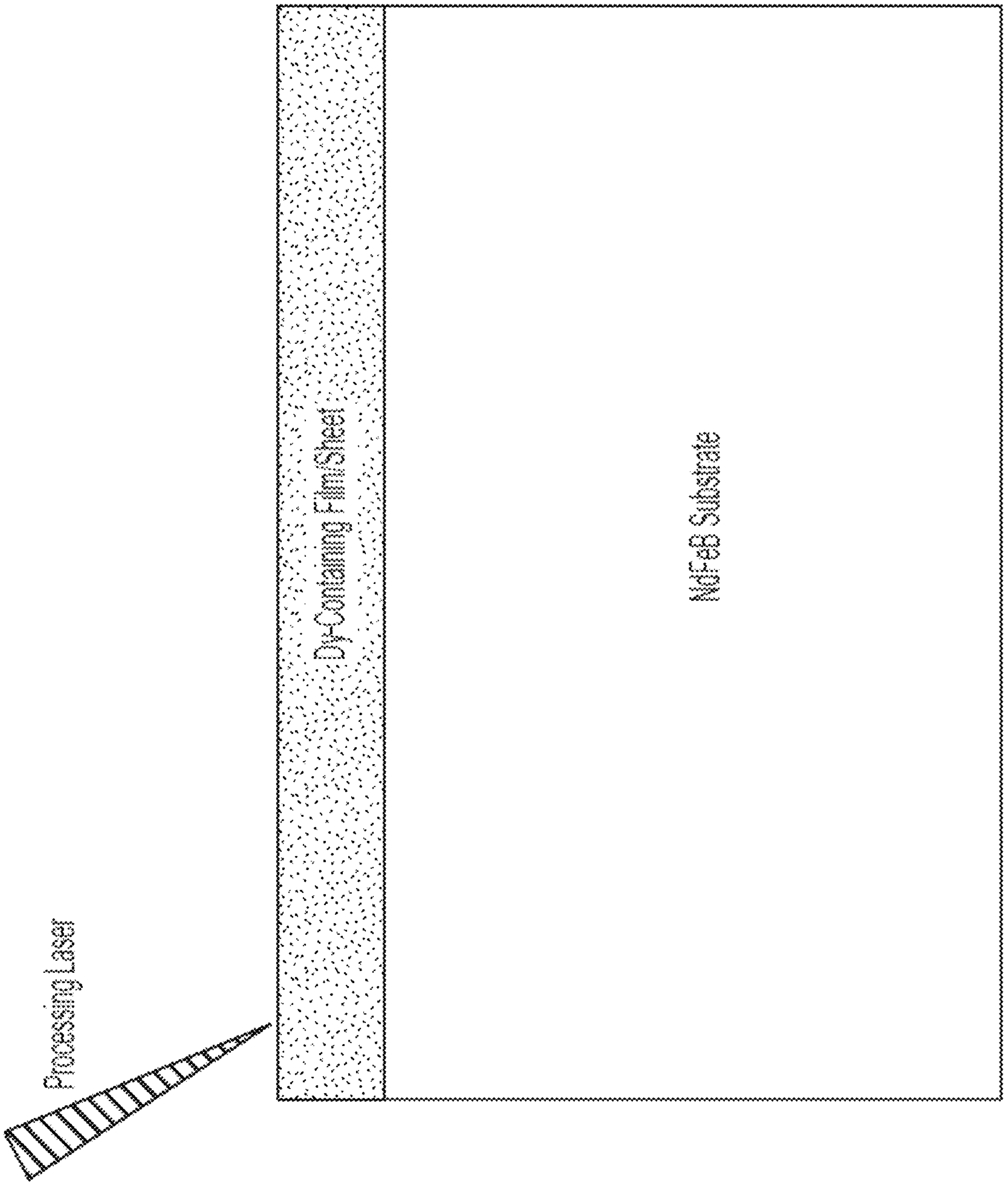
FIG. 1 is a schematic diagram of a film or sheet containing Dy and metal-containing grain-refining nanoparticles disposed on NdFeB substrate, in Example 1.

The magnets, structures, compositions, methods, and systems of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention, in some variations, is predicated on the recognition of various problems in the art of permanent magnets, beyond the known problems discussed in the Background of this specification.

Heretofore, the degradation in performance of permanent-magnet motors has been addressed by compensating the decreased coercivity of NdFeB magnets at operating temperatures with the addition of heavy rare earth (HRE) elements, dysprosium (Dy) and terbium (Tb). Heavy rare earth elements can be effective in increasing the coercivity and thus counteracting demagnetization. However, Dy and Tb pose two major cost-related disadvantages. First, heavy rare earth elements constitute 20-30% of the motor's material costs, and the lack of heavy rare earth supply has caused large price swings. Second, permanent-magnet motors have been conservatively designed to avoid magnet degradation over the long vehicle lifetime, resulting in higher size, weight, power, and cost. Integration of active cooling of permanent-magnet motors has been used to avoid demagnetization, but the cooling infrastructure is problematic from a power, volume, and mass perspective.

Affordable, high-performance permanent-magnet motor technology has relied on high-energy-product NdFeB-based magnets due to the combination of high magnetic saturation from Fe content and large magnetocrystalline anisotropy from the NdFeB crystal structure, generating high magnetic energy density. The variants with highest energy product (B·H) rely on mechanical deformation in pressing and sintering to produce a homogeneous and unique easy-axis texture with high magnetocrystalline anisotropy. A typical NdFeB magnet without Dy or Tb, such as grade N55, exhibits an energy product B·H=54 MG·Oe at room temperature. However, a large negative coercivity temperature coefficient limits the operating temperature to 60-80° C., which is not suitable for a motor. Conventionally, adding Dy increases the coercivity and reduces thermal degradation, but at the expense of remanent magnetization limiting the energy product. For instance, the state-of-art N35AH grade offers an energy product of only 35 MG·Oe at room temperature, but has a 50% smaller coercivity temperature coefficient, enabling a maximum operating temperature of 220° C. The balance of energy product versus power density performance at maximum operating temperature per unit cost for the target application is critical for EV competitiveness.

To reduce heavy rare earth additions to NdFeB magnets, grain-boundary-diffused (GBD) magnets have been developed. GBD magnet technology minimizes the use of heavy rare earth elements while maintaining increased coercivity by limiting the distribution of such elements to the grain boundaries at the magnet surfaces where susceptibility to reversed domain nucleation is high. GBD magnets have about 40% lower total heavy rare earth content compared to fully alloyed magnets with equivalent energy product. However, the diffusion process applies the heavy rare earth elements uniformly and requires a long and costly heat treatment that can increase the grain size, which is not desired.

Other development efforts aimed at eliminating rare earth elements have not been successful. Examples of rare-earth-free magnets include AlNiCo, FeNi, FeN, and MnBi. Generally, the exceptional magnetic properties theoretically predicted have not been experimentally achieved. Other efforts have faced considerable bulk processability challenges due to the reliance on low-temperature or metastable phases, nanoscale structures, or hard magnetic phases that are diluted with compaction aids.

NdFeB microstructure and crystallographic texture can be important parameters in permanent magnets based on NdFeB. It has proven challenging to achieve a final grain size below the single domain limit (~300 nm), in order to generate high coercivities. It has been observed that domain reversal is dependent on resistant nucleation processes rather than domain wall motion which requires less energy to activate. Conventionally processed materials yield grain sizes of about 5-10 μm when starting with micropowder feedstock, even with starting grain sizes are on the order of nanometers. The reason is grain growth during the long (many hours) processing at high temperature required to densify the magnet material. Subsequent die upset forging or backward extrusion can be used to maintain fine grains, but these techniques increase the processing cost significantly. Recent low cost manufacturing technologies leveraging electric current assisted sintering processes can enable short (minutes to seconds long) processing times to achieve fully dense anisotropic magnet materials preserving platelet grains sizes of a few hundred nanometers. See Castle et al., "High coercivity, anisotropic, heavy rare earth-free Nd—Fe—B by Flash Spark Plasma Sintering", Scientific Reports, 7, (2017), which is hereby incorporated by reference.

By contrast, some variations of the present invention provide a permanent magnet with laser-cladded surfaces containing heavy rare earth elements. In some permanent magnet structures disclosed herein, a core permanent magnet is protected from thermally induced demagnetization, generated in electric motor environments, by a surface cladding having an enhanced demagnetization resistance compared to the core magnet region.

The disclosed technology provides several novel aspects. First, the technology provides an architected high-temperature and stable permanent-magnet cladding, or shell, on a high-energy-density core permanent magnet. The resulting cladded permanent magnet increases the performance (energy efficiency) and reduces the cost of electric vehicles by increasing the energy density of permanent-magnet electric motors, among other uses and benefits.

Second, the technology incorporates nanofunctionalized powders containing heavy rare earth elements to generate the magnet cladding, wherein the nanofunctionalized powders contain grain-refining nanoparticles chemically and/or physically disposed on surfaces of magnetic microparticles. The grain-refining nanoparticles can create nanoscale magnetic domains with up to 50% (or more) increased coercivity during laser melting to further resist magnetic reversal.

Third, the technology utilizes laser processing to generate localized demagnetization resistance with optimized microstructures, including tailored texturing, high demagnetization resistance, and low eddy current formation. Laser-based cladding generates a cladded permanent magnet, starting with powder feedstocks having optimized architectures and compositions that lead to a microstructure with locally enhanced magnetic coercivity at permanent-magnet surface locations that are most susceptible to demagnetization. Laser processing enables site-specific deposition, reducing the overall content of heavy rare earth elements even lower than is achieved with conventional grain boundary diffusion. In particular, spatially optimized use of rare earth elements can reinforce resistance to demagnetization only in the most exposed locations, thereby reducing overall rare earth content by 60% to 90% reduction versus the state of art, while increasing the energy product.

Fourth, the technology provides a cladded permanent magnet structure which preserves high-energy-density cores by eliminating or confining thermal exposure in post-processing of magnets. This benefit, in turn, limits the thermal exposure (milliseconds to seconds) of core materials, which increases the achievable energy density of the permanent magnet microstructures. Also, the cladded permanent magnet structure allows the use of higher-temperature demagnetization-resistant materials.

Fifth, in contrast to current solutions using diffusion-based methods for introducing heavy rare earth elements into NdFeB, the disclosed technology is less sensitive to impurities. This benefit facilitates the use of recycled heavy rare earth elements. Because the technology is capable of using powder-based feedstocks, with respect to the rare earth metals, it is possible to incorporate minimally recycled HRE-containing magnet feedstocks. The consequence is a tremendous reduction in magnet cost and reliance on the supply of mined rare earth materials.

The present invention, in some variations, utilizes advanced, high-throughput laser-based additive manufacturing to optimize the architecture of NdFeB or other magnets. Manufacturing-scalable field-assisted laser processing can be employed to produce site-specific demagnetization-resistant microstructures. The disclosed approach can leverage the existing magnet manufacturing infrastructure as well as widely available laser welding tools to rapidly commercialize the technology.

A laser-clad structure protects a high-energy-density core material, which is not necessarily thermally stable, with a higher-thermal-stability outer shell. The material-agnostic and scalable approach allows this technology to be extended broadly to many permanent-magnet materials. This principle that provides for increasing thermal stability at the surface or edges of magnets can be extended to alternative magnet types, including (but not limited to) SmCo, MnAl, AlNiCo, and FeN. Furthermore, this invention can utilize low-purity materials, thereby promoting a sustainable value stream of closed-loop recycled and post-processed magnetic materials.

These innovations allow permanent magnets to maintain higher operational energy densities at elevated temperatures, thereby enabling the design of smaller motors with lower mass, volume, and cost for electric vehicles. Consequently, the electric motors benefit from increased range and payload carrying capacity as well as reduced dependency on rare earth metals. All of these benefits are expected to accelerate the adoption of electric ground and air vehicles.

Some embodiments are predicated on a magnetic material feedstock that contains at least one of the following technical features:

A magnetic micron-sized powder;

Nanoparticles of rare earth elements to raise the coercivity and thermal stability;

Nanoparticles to nucleate grains: nucleating many small grains results in greater coercivity and no macroscopic cracking;

Nanoparticles (e.g. $ZrB_2$) to stop the growth of grains: smaller grains result in greater coercivity and a more uniform structure;

Nanoparticles (e.g., Dy) to modify the magnetic response specifically at grain boundaries, to improve demagnetization (domain reversal) resistance; and Nanoparticles to reduce eddy current formation of the magnet during operation (lower eddy current heating).

Some variations provide a nanofunctionalized magnetic material feedstock comprising:

(a) from about 50 wt % to about 99.5 wt % of magnetic microparticles having an average microparticle effective diameter from about 1 micron to about 500 microns;

(b) from about 0.4 wt % to about 40 wt % of one or more rare earth elements; and (c) from about 0.1 wt % to about 10 wt % of metal-containing grain-refining nanoparticles having an average nanoparticle effective diameter from about 1 nanometer to about 1000 nanometers, wherein at least 1 wt % of the metal-containing grain-refining nanoparticles are chemically and/or physically disposed on surfaces of the magnetic microparticles.

In some embodiments, the magnetic microparticles are a magnetic material selected from the group consisting of NdFeB, DyFeB, SmCo, AlNiCo, MnAl, FeN, $Fe_3O_4$, and combinations thereof.

Various stoichiometries are possible for any of these magnetic materials. The elements making up the magnetic material may be bonded together to form a molecule (compound), may be in solid solution together as a single-phase alloy, or may be present in a multiphase alloy.

It is understood that NdFeB refers to $Nd_xFe_yB_z$ compounds or alloys, wherein x, y, and z can take on various values to form a compound or alloy of iron, neodymium, and boron. In some embodiments, the NdFeB is a neodymium-ferroboron alloy with a neodymium content by weight of about 5% to about 50% (such as from about 20% to about 40%), a boron content by weight of about 0.1% to about 5% (such as from about 0.5% to about 2%), and the balance iron, for example. A common specific compound is $Nd_2Fe_{14}B$. The atomic ratio of iron to neodymium, Fe/Nd, is 7 in $Nd_2Fe_{14}B$. This atomic ratio may vary from about 1 to about 50, such as from about 3 to about 10, for example.

It is understood that DyFeB refers to $Dy_xFe_yB_z$ compounds or alloys, wherein x, y, and z can take on various values to form a compound or alloy of dysprosium, iron, and boron. In some embodiments, the DyFeB is a dysprosium-ferroboron alloy with a dysprosium content by weight of about 5% to about 50% (such as from about 20% to about 40%), a boron content by weight of about 0.1% to about 5% (such as from about 0.5% to about 2%), and the balance iron, for example.

It is understood that SmCo refers to $Sm_xCo_y$ compounds or alloys, wherein x and y can take on various values to form a compound or alloy of samarium and cobalt. In some embodiments, the SmCo is a samarium-cobalt alloy with a samarium content by weight of about 10% to about 50% (such as about 25% to about 40%), and the balance cobalt, for example. Some specific compounds are $Sm_2Co_{17}$ and $SmCo_5$.

It is understood that FeN refers to $Fe_xN_y$ compounds or alloys, wherein x and y can take on various values to form a compound or alloy of iron and nitrogen. For example, FeN may be a compound selected from $Fe_2N$, $Fe_3N_4$, $Fe_4N$, $Fe_7N_3$, $Fe_{16}N_2$, or a combination thereof. In some embodiments, the FeN is an iron-nitrogen with a nitrogen content by weight of about 1% to about 10%, such as about 3% to about 6%, for example.

It is understood that MnAl refers to $Mn_xAl_y$ compounds or alloys, wherein x and y can take on various values to form a compound or alloy of manganese and aluminum. For example, MnAl may be a compound selected from $Mn_{11}Al_8$, $Mn_{14}Al_{11}$, or a combination thereof. In some embodiments, the MnAl is a manganese-aluminum alloy with a manganese content by weight of about 50% to about 90%, such as about 65% to about 75%, for example.

It is understood that AlNiCo refers to alloys of iron, aluminum, nickel, and cobalt. These are referred to in the art as "alnico alloys" in which the presence of iron is implied. In some embodiments, the AlNiCo is an iron-aluminum-nickel-cobalt alloy with an aluminum content by weight of about 5% to about 20%, a nickel content by weight of about 10% to about 35%, a cobalt content of about 2 to about 40%, optionally other elements (e.g., Cu or Ti), and the balance iron, for example.

In this specification, the "rare earth" elements are considered to be Sc, Y, La, Ce, Pr, Nd, Pm, Sm, Eu, Gd, Tb, Dy, Ho, Er, Tm, Yb, and Lu. The "heavy rare earth" elements are considered to be those with at least an atomic number of 64, i.e., Gd, Tb, Dy, Ho, Er, Tm, Yb, and Lu.

In some embodiments, the one or more rare earth elements are selected from the heavy rare earth elements, i.e., selected from the group consisting of Gd, Tb, Dy, Ho, Er, Tm, Yb, Lu, and combinations thereof. A preferred heavy rare earth element is dysprosium (Dy).

In some embodiments, the concentration of rare earth elements in the nanofunctionalized magnetic material feedstock may be selected from about 0.5 wt % to about 20 wt %. In various embodiments, the concentration of rare earth elements in the nanofunctionalized magnetic material feedstock is about, at least about, or at most about 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 6, 7, 8, 9, 10, 15, 20, 25, 30, 35, or 40 wt %, including any intervening range (e.g., 0.6-2.6 wt %). When there are multiple rare earth elements, the concentration of each rare earth element may be selected from these ranges, provided that the total concentration of all rare earth elements in aggregate does not exceed about 40 wt %.

In certain embodiments, the one or more rare earth elements are selected from the group consisting of Dy, Pr, Tb, Ce, and Nd. The one or more rare earth elements, in part (b) of the nanofunctionalized magnetic material feedstock, are distinct from any rare earth elements that may be present in the base magnetic microparticles. For example, when the base magnetic microparticles in part (a) of the nanofunctionalized magnetic material feedstock are made from neodymium-iron-boron alloy $Nd_2Fe_{14}B$, the neodymium content in that alloy is not counted toward the 0.4-40 wt % concentration of rare earth elements in part (b). Also, the presence of rare earth elements in the magnetic microparticles is an independent selection from rare earth elements separately contained in the nanofunctionalized magnetic material feedstock. In some embodiments, it is desirable for the rare earth elements to be atomically the same (e.g., Dy or Nd both in the magnetic microparticles and as a separate rare earth element). In other embodiments, it is desirable for the rare earth elements to be atomically different (e.g., Nd in the magnetic microparticles and Dy as a separate rare earth element in the feedstock). Note again that the base magnetic microparticles need not have a rare earth element at all.

In some embodiments, one or more rare earth elements are alloyed with Cu in the form of a eutectic mixture, which has a melting point lower than either Cu or the rare earth element(s) in the eutectic mixture. One example is a low-melting-point Dy—Cu eutectic alloy. Another example is a low-melting-point Pr—Cu eutectic alloy. The Cu is not counted toward the concentration of the one or more rare earth elements in the nanofunctionalized magnetic material feedstock. That is, the nanofunctionalized magnetic material feedstock contains from about 0.4 wt % to about 40 wt % of the rare earth element(s), whether or not those rare earth elements are in the form of a eutectic mixture. The 0.4-40 wt % concentration is not referring to the concentration of rare earth metals within the eutectic mixture itself.

In some embodiments, the metal-containing grain-refining nanoparticles are a zirconium-containing material selected from Zr, ZrC, $ZrB_2$, $ZrH_2$, $ZrO_2$, $Zr_2O_3$, or a combination thereof. In certain embodiments, the zirconium-containing material is ZrC, $ZrB_2$, or a combination of ZrC and $ZrB_2$.

The rare earth elements may be present as separate particles in the nanofunctionalized magnetic material feedstock. The particles may have an average particle size from about 1 nanometer to about 100 microns, such as from about 10 nanometers to about 10 microns (e.g., ultrafine powders, particulates, etc.). In certain embodiments, the rare earth elements are placed on magnetic microparticles (e.g., a core magnetic region) by laying down a powder, a sheet, a film, or a slab.

Alternatively, or additionally, the rare earth elements may be chemically and/or physically disposed on surfaces of the magnetic microparticles, similar to how the grain-refining nanoparticles are also disposed on surfaces of the magnetic microparticles. In certain embodiments, the rare earth elements and the grain-refining nanoparticles are combined into single particles that are chemically and/or physically disposed on surfaces of the magnetic microparticles. In certain embodiments, the rare earth elements are chemically and/or physically disposed on surfaces of the grain-refining nanoparticles, which are themselves disposed chemically and/or physically disposed on surfaces of the magnetic microparticles.

In some embodiments of the nanofunctionalized magnetic material feedstock, the magnetic microparticles are substantially spherical. In other embodiments, the magnetic microparticles are non-spherical. The shape of the magnetic microparticles may vary widely, such as needles, rods, plates, cubes, prisms, triangular prisms, square pyramids, cuboids, cylinders, cones, random shapes, or a combination thereof, for example.

The average microparticle effective diameter may be about 100 microns or less. In certain embodiments, the average microparticle effective diameter is about 10 microns or less. In various embodiments, the average microparticle effective diameter is about, at least about, or at most about 1, 2, 3, 4, 5, 10, 15, 20, 25, 30, 40, 50, 60, 70, 80, 90, 100, 200, 300, 400, or 500 microns, including any intervening range.

The average nanoparticle effective diameter may be about 100 nanometers or less. In certain embodiments, the average nanoparticle effective diameter is about 10 nanometers or less. In various embodiments, the average nanoparticle effective diameter is about, at least about, or at most about 1, 2, 3, 4, 5, 10, 15, 20, 25, 30, 40, 50, 60, 70, 80, 90, 100, 200, 300, 400, 500, 600, 700, 800, 900, or 1000 nanometers, including any intervening range.

Preferably, the average nanoparticle effective diameter is less than the average microparticle effective diameter. Typically, the size of the nanoparticles is several orders of magnitude smaller than the size of the microparticles. As an example, when the average nanoparticle effective diameter is 100 nanometers and the average microparticle effective diameter is 100 microns, the microparticles are, on average, 1000 times larger than the nanoparticles. In various embodiments, the ratio of average microparticle effective diameter to average nanoparticle effective diameter is about, at least about, or at most about 2, 5, 10, 50, 100, 200, 300, 400, 500, 1000, 2000, 3000, 4000, or 5000, including any intervening range.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

Preferably, at least 10 wt % of the metal-containing grain-refining nanoparticles are chemically and/or physically disposed on surfaces of the magnetic microparticles. In some embodiments, at least 50 wt % of the metal-containing grain-refining nanoparticles are chemically and/or physically disposed on surfaces of the magnetic microparticles. In certain embodiments, essentially all of the metal-containing grain-refining nanoparticles are chemically and/or physically disposed on surfaces of the magnetic microparticles. In various embodiments, at least 1, 5, 10, 15, 20, 25, 30, 40, 50, 60, 70, 80, 90, 95, 99, 99.5, 99.9, or 100 wt % of the metal-containing grain-refining nanoparticles are chemically and/or physically disposed on surfaces of the magnetic microparticles.

In some embodiments, the metal-containing grain-refining nanoparticles are chemically disposed on surfaces of the magnetic microparticles, which means that there are chemical bonds formed between nanoparticles and microparticles. Chemical bonds may be metallic bonds, ionic bonds, covalent bonds, electrostatic bonds (e.g., van der Waals forces), or a combination thereof. In some embodiments, the metal-containing grain-refining nanoparticles are physically (but not necessarily chemically) disposed on surfaces of the magnetic microparticles, which means that there is some physical force holding nanoparticles on the surface of microparticles. Some types of bonding can be considered either chemical or physical. For example, physisorption is adsorption in which the molecular interactions between adsorbate molecules (nanoparticles) and the adsorbent (microparticles) are primarily governed by van der Waals forces.

The metal-containing grain-refining nanoparticles may form a continuous coating on the magnetic microparticles. A continuous coating means there is 100% surface coverage of the metal-containing grain-refining nanoparticles on the magnetic microparticles.

Alternatively, the metal-containing grain-refining nanoparticles may form a discontinuous coating on the magnetic microparticles. The discontinuous coating may have a surface coverage from about 1% to about 99%, such as from about 10% to about 50%, on the magnetic microparticles. In various embodiments, the discontinuous coating has a surface coverage of about, at least about, or at most about 1%, 5%, 10%, 15%, 20%, 25%, 30%, 40%, 50%, 60%, 70%, 80%, 90%, 95%, or 99%, including any intervening range.

In some embodiments, the nanofunctionalized magnetic material feedstock comprises at least about 1 wt % of metal-containing grain-refining nanoparticles. In certain embodiments, the nanofunctionalized magnetic material feedstock comprises at least about 5 wt % of metal-containing grain-refining nanoparticles. In various embodiments, the nanofunctionalized magnetic material feedstock comprises about, at least about, or at most about 0.1, 0.2, 0.3, 0.4, 0.5, 0.6, 0.7, 0.8, 0.9, 1, 1.5, 2, 2.5, 3, 4, 5, 6, 7, 8, 9, or 10 wt % of metal-containing grain-refining nanoparticles, including any intervening range.

In some embodiments, the nanofunctionalized magnetic material feedstock further comprises a magnetic nanomaterial selected from the group consisting of NdFeB, DyFeB, SmCo, AlNiCo, MnAl, FeN, $Fe_3O_4$, and combinations thereof. The magnetic nanomaterial is distinct from the base magnetic microparticles in part (a) of the nanofunctionalized magnetic material feedstock. The magnetic nanomaterial may be chemically and/or physically disposed on surfaces of the magnetic microparticles, chemically and/or physically disposed on surfaces of the grain-refining nanoparticles, present as free nanoparticles in the feedstock, or a combination thereof. When present, the magnetic nanomaterial may have a concentration in the nanofunctionalized magnetic material feedstock of about, at least about, or at most about 0.1, 0.5, 1, 2, 3, 4, 5, 10, 15, 20, or 25 wt %, including any intervening range, for example.

In some embodiments, the nanofunctionalized magnetic material feedstock further comprises a grain-growth-restriction agent selected from Cu, B, or a combination thereof. The grain-growth-restriction agent is distinct from any copper or boron that may be present in the magnetic microparticles (e.g., boron in $Nd_2Fe_{14}B$) or in grain-refining nanoparticles (e.g., boron in $ZrB_2$). Other grain-growth-restriction agents may be used. The grain-growth-restriction agent may be chemically and/or physically disposed on surfaces of the magnetic microparticles, chemically and/or physically disposed on surfaces of the grain-refining nanoparticles, present as free grain-growth-restriction agent particles in the feedstock, or a combination thereof. When present, the grain-growth-restriction agent may have a concentration in the nanofunctionalized magnetic material feedstock of about, at least about, or at most about 0.1, 0.5, 1, 2, 3, 4, 5, or 10 wt %, including any intervening range, for example.

In some embodiments, the nanofunctionalized magnetic material feedstock further comprises a grain-boundary modifier selected from the group consisting of $Dy_2O_3$, Cu, Nd, and combinations thereof. The grain-boundary modifier is distinct from any material that may be present in the magnetic microparticles (e.g., neodymium in $Nd_2Fe_{14}B$) or in rare earth elements (e.g., dysprosium in $Dy_2O_3$). The grain-boundary modifier may be chemically and/or physically disposed on surfaces of the magnetic microparticles, chemically and/or physically disposed on surfaces of the grain-refining nanoparticles, present as free grain-boundary modifier particles in the feedstock, or a combination thereof. When present, the grain-boundary modifier may have a concentration in the nanofunctionalized magnetic material feedstock of about, at least about, or at most about 0.1, 0.5, 1, 2, 3, 4, 5, or 10 wt %, including any intervening range, for example. Grains and grain boundaries are influenced by the selection of other components and the method of using the nanofunctionalized magnetic material feedstock, in addition to the optional inclusion of a grain-boundary modifier.

In some embodiments, the nanofunctionalized magnetic material feedstock further comprises an electrical-resistivity modifier selected from the group consisting of $Dy_2O_3$, $Al_2O_3$, $Zr_2O_3$, $ZrO_2$, $Y_2O_3$, $Ce_2O_3$, $CeO_2$, AiN, $SiO_2$, $TiB_2$, TiC, $ZrB_2$, ZrC, and combinations thereof. Generally, these compounds are electrically resistive and will increase the electrical resistivity of the nanofunctionalized magnetic material feedstock. The electrical-resistivity modifier is distinct from the magnetic microparticles, the rare earth elements, and the grain-refining nanoparticles. The electrical-resistivity modifier may be chemically and/or physically disposed on surfaces of the magnetic microparticles, chemically and/or physically disposed on surfaces of the grain-refining nanoparticles, present as free electrical-resistivity modifier particles in the feedstock, or a combination thereof. When present, the electrical-resistivity modifier may have a concentration in the nanofunctionalized magnetic material feedstock of about, at least about, or at most about 0.1, 0.5, 1, 2, 3, 4, 5, or 10 wt %, including any intervening range, for example.

The nanofunctionalized magnetic material feedstock may further contain one or more additives, separately from any grain-growth-restriction agent, grain-boundary modifier, or electrical-resistivity modifier. As will be appreciated, there are many possible reasons for including additives, many types of additives, and wide ranges of additive concentration that may be used. Additives may be functional, such as additives to adjust feedstock density, viscosity, or processibility; or ornamental, such as additives to adjust feedstock color.

The nanofunctionalized magnetic material feedstock may be converted into a cladded permanent magnet, using a method as disclosed herein, or another technique.

Some variations of the invention provide a cladded permanent magnet comprising:

(a) a core magnet region containing a core magnetic material; and (b) a magnet cladding containing a shell magnetic material, wherein the shell magnetic material comprises (i) a magnetic compound that is chemically the same as the core magnetic material, (ii) one or more rare earth elements, and (iii) metal-containing grain-refining nanoparticles, wherein the magnet cladding is disposed on the core magnet region, wherein the magnet cladding is chemically distinct and physically distinct from the core magnet region, and wherein the magnet cladding has at least 10% higher ambient-temperature magnetic coercivity compared to the core magnet region, wherein the ambient-temperature magnetic coercivity is measured at 25° C.

The magnet cladding being "disposed on" the core magnet region can mean that the magnet cladding is physically distinct from the core magnet region, or that the magnet cladding is somewhat intermixed with the core magnet region such that there is not a sharp interface between the core magnet region and the magnet cladding. For example, there may be a graded concentration of rare earth elements from a high concentration (e.g., about 15 wt %) at the magnet outer surface to zero, or a low value (such as the concentration of rare earth elements in the core magnet region), at some point in the depth of the core magnet region. If the magnet cladding is deemed to stop where there are no added rare earth elements (e.g., Dy) in the core magnet region (e.g., NdFeB), the interface between the magnet cladding and the core magnet region will typically not be perfect due to varying extents of diffusion.

Preferably, there is a physically continuous interface between the magnet cladding and the core magnet region. A physically continuous interface means that there is no volumetric gap (open space) between the magnet cladding and the core magnet region, except for inherent material porosity. A physically continuous interface is preferred to avoid the cladded permanent magnet from breaking apart, with the magnet cladding detaching from the core magnet region. In certain embodiments, the physically continuous interface is crystallographically continuous, such as epitaxially matched.

In some embodiments, the magnet cladding has at least 50% higher ambient-temperature magnetic coercivity compared to the core magnet region. In certain embodiments, the magnet cladding has at least 90% higher ambient-temperature magnetic coercivity compared to the core magnet region. In various embodiments, the ratio of the ambient-temperature magnetic coercivity of the magnet cladding, relative to the ambient-temperature magnetic coercivity of the core magnet region, is about, at least about, or at most about 1.5, 2, 2.5, 3, 4, 5, 6, 7, 8, 9, or 10, including any intervening range.

The cladded permanent magnet may also have improved magnetic coercivity at elevated temperatures, in which case the cladded permanent magnet may be referred to as being "thermally stable." In some embodiments, the magnet cladding has at least 10% higher elevated-temperature magnetic coercivity compared to the core magnet region, wherein the elevated-temperature magnetic coercivity is measured at 150° C. In certain embodiments, the magnet cladding has at least 50% higher elevated-temperature magnetic coercivity compared to the core magnet region. In various embodiments, the ratio of the elevated-temperature magnetic coercivity of the magnet cladding, relative to the elevated-temperature magnetic coercivity of the core magnet region, is about, at least about, or at most about 1.5, 2, 2.5, 3, 4, 5, 6, 7, 8, 9, or 10, including any intervening range. Note that the reference temperature of 150° C. for measuring the elevated-temperature magnetic coercivity does not require that the magnet actually be operated at 150° C. The cladded permanent magnet may be actually used at lower, or higher, temperatures than 150° C. For example, cladded permanent magnets with core magnetic materials of AlNiCo or SmCo can operate well in excess of 150° C.

The cladded permanent magnet may be produced starting from a disclosed nanofunctionalized magnetic material feedstock.

In some cladded permanent magnets, the core magnetic material is selected from the group consisting of NdFeB, DyFeB, SmCo, AlNiCo, MnAl, FeN, $Fe_3O_4$, and combinations thereof.

In addition to the core magnetic material, the core magnet region may also contain one or more rare earth elements, such as Dy or Tb, when those elements are not otherwise included stoichiometrically (such as is the case with Dy being present in DyFeB). For example, in the case of NdFeB, one or both of Dy or Tb may be included in the core magnet region-along with the NdFeB-either in separate phases or in the same phase as that containing the NdFeB.

Various stoichiometries are possible for any of these core magnetic materials within the cladded permanent magnets. The elements making up the core magnetic material may be bonded together to form a molecule (compound), such as $Nd_2Fe_{14}B$, may be in solid solution together as a single-phase alloy, or may be present in a multiphase alloy. Certain elements, such as B, Dy, or Tb, may be considered dopants in some embodiments.

It is understood that NdFeB refers to $Nd_xFe_yB_z$ compounds or alloys, wherein x, y, and z can take on various values to form a compound or alloy of iron, neodymium, and boron. In some embodiments, the NdFeB is a neodymium-ferroboron alloy with a neodymium content by weight of about 5% to about 50% (such as from about 20% to about 40%), a boron content by weight of about 0.1% to about 5% (such as from about 0.5% to about 2%), and the balance iron, for example. A common specific compound is $Nd_2Fe_{14}B$. The atomic ratio of iron to neodymium, Fe/Nd, is 7 in $Nd_2Fe_{14}B$. This atomic ratio may vary from about 1 to about 50, such as from about 3 to about 10, for example.

It is understood that DyFeB refers to $Dy_xFe_yB_z$ compounds or alloys, wherein x, y, and z can take on various values to form a compound or alloy of dysprosium, iron, and boron. In some embodiments, the DyFeB is a dysprosium-ferroboron alloy with a dysprosium content by weight of about 5% to about 50% (such as from about 20% to about 40%), a boron content by weight of about 0.1% to about 5% (such as from about 0.5% to about 2%), and the balance iron, for example.

It is understood that SmCo refers to $Sm_xCo_y$ compounds or alloys, wherein x and y can take on various values to form a compound or alloy of samarium and cobalt. In some embodiments, the SmCo is a samarium-cobalt alloy with a samarium content by weight of about 10% to about 50% (such as about 25% to about 40%), and the balance cobalt, for example. Some specific compounds are $Sm_2Co_{17}$ and $SmCo_5$.

It is understood that FeN refers to $Fe_xN_y$ compounds or alloys, wherein x and y can take on various values to form a compound or alloy of iron and nitrogen. For example, FeN may be a compound selected from $Fe_2N$, $Fe_3N_4$, $Fe_4N$, $Fe_7N_3$, $Fe_{16}N_2$, or a combination thereof. In some embodiments, the FeN is an iron-nitrogen with a nitrogen content by weight of about 1% to about 10%, such as about 3% to about 6%, for example.

It is understood that MnAl refers to $Mn_xAl_y$ compounds or alloys, wherein x and y can take on various values to form a compound or alloy of manganese and aluminum. For example, MnAl may be a compound selected from $Mn_{11}Al_8$, $Mn_{14}Al_{11}$, or a combination thereof. In some embodiments, the MnAl is a manganese-aluminum alloy with a manganese content by weight of about 50% to about 90%, such as about 65% to about 75%, for example.

It is understood that AlNiCo refers to alloys of iron, aluminum, nickel, and cobalt. In some embodiments, the AlNiCo is an iron-aluminum-nickel-cobalt alloy with an aluminum content by weight of about 5% to about 20%, a nickel content by weight of about 10% to about 35%, a cobalt content of about 2 to about 40%, optionally other elements (e.g., Cu or Ti), and the balance iron, for example.

In some embodiments of cladded permanent magnets, the one or more rare earth elements are selected from the heavy rare earth elements, i.e., selected from the group consisting of Gd, Tb, Dy, Ho, Er, Tm, Yb, Lu, and combinations thereof. A preferred heavy rare earth element is dysprosium (Dy). Another preferred heavy rare earth element is terbium (Tb).

In certain cladded permanent magnets, the one or more rare earth elements are selected from the group consisting of Dy, Pr, Tb, Ce, and Nd. The one or more rare earth elements, in the magnet cladding, are distinct from any rare earth elements that may be present in the core magnet region. For example, when the core magnet region of the cladded permanent magnet is made from neodymium-iron-boron alloy $Nd_2Fe_{14}B$, the neodymium content in that alloy is different than the magnet-cladding rare earth elements, which could be Nd or another rare earth element, such as Dy or Pr. The presence of rare earth elements (if any) in the core magnet region is an independent selection from rare earth elements separately contained in the magnet cladding. In some embodiments, it is desirable for the rare earth elements to be atomically the same (e.g., Nd both in the core magnet region and as a separate rare earth element). In other embodiments, it is desirable for the rare earth elements to be atomically different (e.g., Nd in the core magnet region and Dy as a separate rare earth element in the cladding). Note again that the core magnet region need not have a rare earth element at all, as in the case of SmCo, AlNiCo, MnAl, FeN, etc.

In some cladded permanent magnets, one or more rare earth elements are selected from the group consisting of Dy, Tb, Pr, Ce, and Nd. In certain embodiments, one or more rare earth elements are alloyed with Cu in the form of a eutectic mixture, such as Dy—Cu and/or Pr—Cu.

In some cladded permanent magnets, the concentration of rare earth elements in the overall magnet may be selected from about 0.4 wt % to about 40 wt %. In various embodiments, the concentration of rare earth elements in the cladded permanent magnet is about, at least about, or at most about 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 6, 7, 8, 9, 10, 15, 20, 25, 30, 35, or 40 wt %, including any intervening range (e.g., 0.6-2.6 wt %). When there are multiple rare earth elements, the concentration of each rare earth element may be selected from these ranges, provided that the total concentration of all rare earth elements in aggregate does not exceed about 40 wt %.

The concentration of rare earth elements in the magnet cladding itself may be selected from about 1 wt % to about 95 wt %. In various embodiments, the concentration of rare earth elements in the magnet cladding is about, at least about, or at most about 1, 1.5, 2, 2.5, 3, 3.5, 4, 4.5, 5, 6, 7, 8, 9, 10, 15, 20, 25, 30, 35, 40, 45, 50, 55, 60, 65, 70, 75, 80, 85, 90, or 95 wt %, including any intervening range (e.g., 2.5-30 wt %). When there are multiple rare earth elements, the concentration of each rare earth element may be selected from these ranges, provided that the total concentration of all rare earth elements in aggregate does not exceed about 95 wt %.

As noted earlier, the core magnet region may contain a rare earth element, in addition to containing a core magnetic material. This rare earth element can be part of the molecular structure of the core magnetic material, such as neodymium in $Nd_2Fe_{14}B$. Alternatively, or additionally, a rare earth element in the core magnet region may be a dopant, an intercalant, a dissolved element, or a phase-separated element. The concentration of rare earth elements in the core magnet region may be selected from 0 wt % to about 30 wt %. In various embodiments, the concentration of rare earth elements in the core magnet region is about, at least about, or at most about 0, 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, 10, 11, 12, 13, 14, 15, 20, 25, or 30 wt %, including any intervening range. When there are multiple rare earth elements in the core magnet region (e.g., both Nd and Tb), the concentration of each rare earth element may be selected from these ranges.

In preferred embodiments, for a given rare earth element, the concentration of that element in the shell magnetic material is higher than the concentration in the core magnet region. For example, in the case of the core magnetic material being $Nd_2Fe_{14}B$, which contains about 27 wt % Nd, and the shell magnetic material containing only Nd as a rare earth element, then the shell magnetic material preferably contains more than 27 wt % Nd. As another example, in the case of the core magnetic material being $Nd_2Fe_{14}B$, and the core magnet region also containing 1 wt % Dy dopant, on the one hand; and the shell magnetic material containing only Dy as a rare earth element, on the other hand; then the shell magnetic material preferably contains more than 1 wt % Dy.

In some cladded permanent magnets, the metal-containing grain-refining nanoparticles are selected from the group consisting of Zr, ZrC, $ZrB_2$, $ZrH_2$, $ZrO_2$, $Zr_2O_3$, and combinations thereof.

In some cladded permanent magnets, the concentration of metal-containing grain-refining nanoparticles in the overall magnet may be selected from about 0.1 wt % to about 10 wt %. In various embodiments, the cladded permanent magnet comprises about, at least about, or at most about 0.1, 0.2, 0.3, 0.4, 0.5, 0.6, 0.7, 0.8, 0.9, 1, 1.5, 2, 2.5, 3, 4, 5, 6, 7, 8, 9, or 10 wt % of metal-containing grain-refining nanoparticles, including any intervening range.

The concentration of metal-containing grain-refining nanoparticles in the magnet cladding itself may be selected from about 0.2 wt % to about 25 wt %. In various embodiments, the magnet cladding comprises about, at least about, or at most about 0.2, 0.3, 0.4, 0.5, 0.6, 0.7, 0.8, 0.9, 1, 1.5, 2, 2.5, 3, 4, 5, 6, 7, 8, 9, 10, 11, 12, 13, 14, 15, 20, or 25 wt % of metal-containing grain-refining nanoparticles, including any intervening range.

Figure 3:
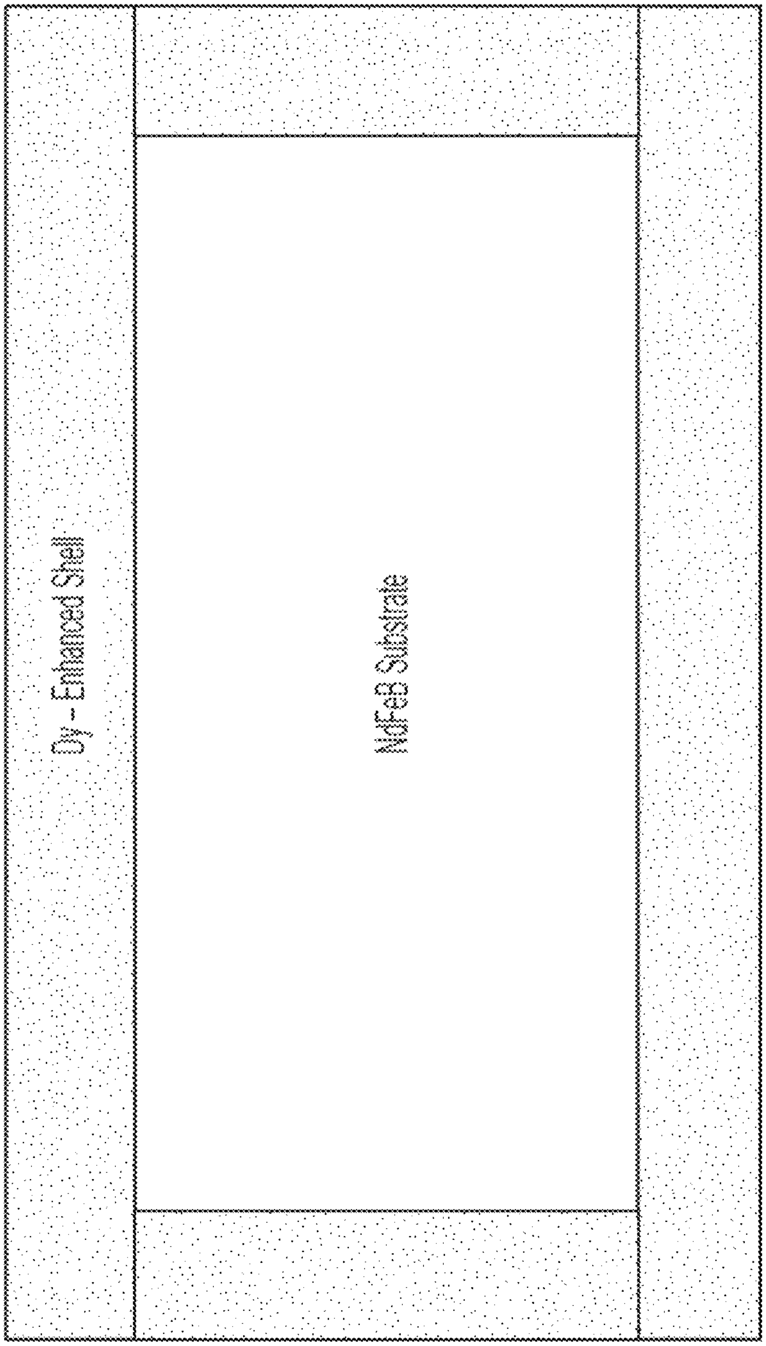
FIG. 3 is a schematic diagram of a cladded permanent magnet in which a shell containing Dy surrounds the NdFeB substrate, in Example 1.

The magnet cladding may be a continuous cladding that forms a shell on all surfaces surrounding the core magnet region. FIG. 3 depicts an exemplary structure with a continuous cladding. A continuous cladding may be used to distribute the shell magnetic material isotropically in density and depth across the cladded permanent magnet.

Figure 4:
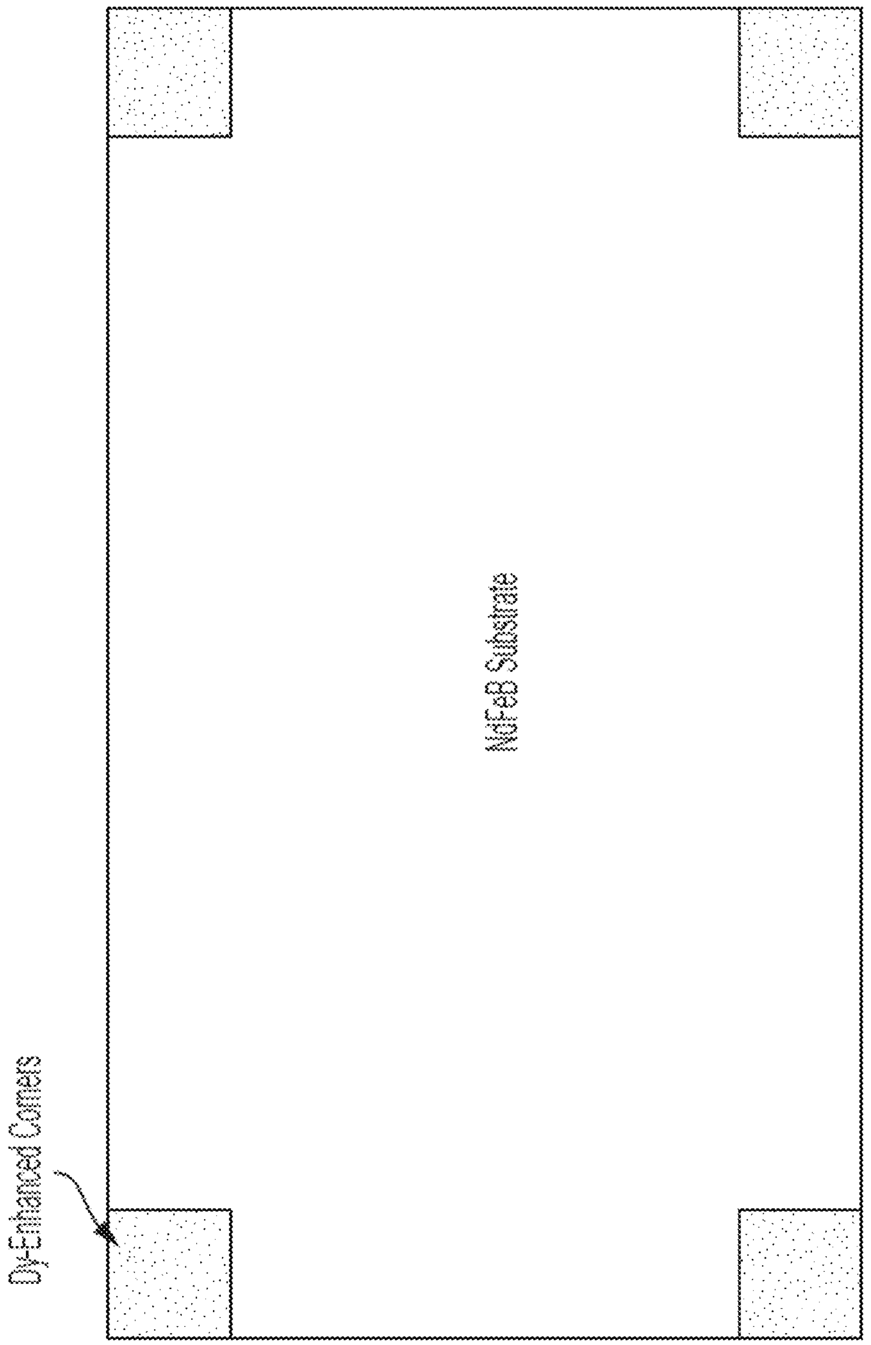
FIG. 4 is a schematic diagram of a cladded NdFeB permanent magnet in which enhanced corner regions contain Dy, in Example 1.

Alternatively, the magnet cladding may be a discontinuous cladding. A discontinuous cladding may be disposed on one or more edges of the core magnet region. The one or more edges may include a trailing edge of an electric motor, for example. Alternatively, or additionally, a discontinuous cladding may be disposed at one or more corners of the core magnet region. Alternatively, or additionally, a discontinuous cladding may be disposed in one or more vertices within the core magnet region. A discontinuous cladding may form a pattern on the core magnet region. The pattern may be checkered, graded, circular, or another pattern, which may be relatively simple or complex (such as via detailed magnet simulation software). FIG. 4 depicts an exemplary structure with a discontinuous cladding. A discontinuous cladding may be used to distribute the shell magnetic material anisotropically in density and depth across the cladded permanent magnet.

The magnet cladding typically has a higher concentration of one or more rare earth elements compared to the core magnet region. In various embodiments, the one or more rare earth elements are present in the magnet cladding at an average concentration from about 0.1 wt % to about 50 wt %, such as from about 1 wt % to about 25 wt %. In some embodiments, the one or more rare earth elements are uniformly distributed and concentrated within the magnet cladding. In other embodiments, the one or more rare earth elements have a graded concentration within the magnet cladding. For example, the one or more rare earth elements may be at a maximum concentration at an outer surface of the magnet cladding, and at a minimum concentration at an inner surface of the magnet cladding. The inner surfaces face the core magnet region. When multiple rare earth elements are utilized, there are even more design choices; for example, the distribution of each of the rare earth elements within the cladding may be varied independently of the distributions of all the other rare earth elements within the cladding. For example, Nd concentration could be uniform within the magnet cladding while Dy concentration could be graded, non-uniform, or random within the magnet cladding.

In certain embodiments, the one or more rare earth elements have a non-uniform and pre-programmed concentration within the magnet cladding. In this specification, a "pre-programmed concentration" of a rare earth element means that prior to fabrication of the cladded permanent magnet, design calculations are performed to determine a concentration profile of the a rare earth element within one or more dimensions of the magnet cladding, such as the lateral dimension (perpendicular to the surface) or the vertical dimension (into the depth of the cladding). The design calculations may be aided by a computer and by software, known in the art, to simulate the final magnet cladding and the cladded permanent magnet. Pre-programming in this manner does not guarantee that the ultimate cladded permanent magnet exactly matches the design, but it helps ensure the concentration profile of the rare earth element is not random.

In some embodiments, the magnet cladding is produced by solidifying a melt pool generated from a laser (e.g., see FIG. 1), electron beam, or other source of melting. The melt pool may contain a molten form of one or more rare earth elements, a molten form of the core magnetic material, or a molten form of one or more rare earth elements and a molten form of the core magnetic material. In certain embodiments, the melt pool also contains a molten form of metal-containing grain-refining nanoparticles. Any of the rare earth elements, the core magnetic material, and the grain-refining nanoparticles may partially melt into the melt pool and partially remain solid while the magnet cladding is being fabricated.

In typical embodiments, the grain-refining nanoparticles do not melt, due to their very high melting points (e.g., 1855° C. for Zr and 3532° C. for ZrC). In some embodiments, a selected grain-refining nanoparticle has a relatively low melting point (e.g., 800 C for $ZrH_2$) and would be expected to also melt. In certain embodiments, a grain-refining nanoparticle initially melts but then is converted to another nanoparticle or nanoparticulate that resolidifies. For example, $ZrH_2$ may be converted to Zr due to hydrogen evolution or to $Al_3Zr$ due to reactions with aluminum, such as when the core magnet region contains AlNiCo or MnAl.

In some embodiments utilizing a melt pool (e.g., a laser-generated melt pool or a melt pool from a thermal spray), one or more rare earth elements are partially or fully melted, while the core magnetic material and the grain-refining nanoparticles are not melted.

In some embodiments utilizing a melt pool (e.g., a laser-generated melt pool), the core magnetic material is melted, while the one or more rare earth elements and the grain-refining nanoparticles are not melted. These embodiments typically require that the melting point of the core magnetic material is lower than the melting point of the rare earth elements and of the grain-refining nanoparticles. It is also possible to use a laser to generate a melt pool at the surface of the core magnetic material prior to introducing rare earth elements. If the rare earth elements are then introduced, such as via atomic layer deposition or laser ablation, some or all of the rare earth elements may be able to diffuse through the molten core magnetic material prior to themselves undergoing a phase change (solid to liquid).

In certain embodiments, none of the rare earth elements, the core magnetic material, or the grain-refining nanoparticles melt during fabrication of the cladded permanent magnet. For example, a surface of the core magnet region may be heated but not melted, causing thermally assisted diffusion of one or more rare earth elements into the surface, thereby generating a shell magnetic material. In these embodiments, there is no melt pool. Also, because melting and resolidification (grain growth) does not occur, the grain-refining nanoparticles may be omitted in these particular embodiments.

Some embodiments provide a cladded permanent magnet comprising:

(a) a core magnet region containing a core magnetic material; and (b) a magnet cladding containing a shell magnetic material, wherein the shell magnetic material comprises (i) a magnetic compound that is chemically the same as the core magnetic material and (ii) one or more rare earth elements, wherein the magnet cladding is disposed on the core magnet region, wherein the magnet cladding is chemically distinct and physically distinct from the core magnet region, and wherein the magnet cladding has at least 10% higher ambient-temperature magnetic coercivity compared to the core magnet region, wherein the ambient-temperature magnetic coercivity is measured at 25° C.

In the magnet cladding, at the outer surface, it is possible that there is an outer thin shell consisting of one or more rare earth elements, or consisting of the rare earth elements and the grain-refining nanoparticles, without the core magnetic material. This outer thin shell is a subshell within the shell magnetic material, wherein the shell magnetic material still contains core magnetic material. The outer thin shell may be introduced intentionally, such as via a final thermal spray after laser-based additive manufacturing, or unintentionally, such as via formation of an equilibrium or metastable phase of the rare earth elements at the outward surface.

In some embodiments, laser ablation is utilized during fabrication of the magnet cladding. In this specification, "laser ablating" and "laser ablation" are defined as the use of a laser to physically force a first material (in the present context, the rare earth elements) into a second material (in the present context, the core magnetic material). In some embodiments, laser ablation utilizes momentum transfer of rare earth elements impinging a selected surface of the core magnetic material. With laser ablation, rare earth atoms may be shoved into pores or spaces between core magnetic material molecules, trapped in crystal lattices of core magnetic material molecules, intercalated within core magnetic material molecules, dissolved in the same phase as core magnetic material molecules, suspended within another phase that is different from the core magnetic material phase, or a combination thereof. In these embodiments of laser ablation, there may be no loss of the core magnetic material.

In other embodiments using laser ablation, there may be erosion of a small portion of the core magnetic material, whereby core magnetic material is ejected or evolved, such as via spallation. Such removal of core magnetic material may provide space for rare earth elements to be incorporated into the core composition. However, ejection of core magnetic material is generally not desirable because magnetic material is lost (reduced mass efficiency) and may become lodged elsewhere as an impurity.

In certain embodiments, laser ablation utilizes a pulsed laser or a high-intensity, continuous-wave laser beam. While relatively long laser pulses (e.g. nanosecond pulses) can overheat and thermally damage the magnetic materials, ultrashort laser pulses (e.g. femtoseconds) cause minimal material damage during processing due to the ultrashort light-matter interaction. Excimer lasers of deep ultraviolet light (such as with a wavelength of about 100 nm) may be used in laser ablation. A combination of laser-melting and laser-ablation mechanisms may be employed in certain methods of fabricating a magnet cladding.

In some embodiments, the shell magnetic material is preferentially located at grain boundaries within the magnet cladding. In some embodiments, the shell magnetic material is preferentially located within grains that are within the magnet cladding. Grains may be solidified grains from laser-based additive manufacturing or welding, for example. The grains may be equiaxed grains, nucleated by the grain-refining nanoparticles. The grains may have a magnetic easy axis that is dictated by a crystallographic texture of the grains. The grains may contain a high-energy-product material surrounded (e.g., NdFeB) by a thermally stable shell material. A "high-energy-product material" is one with an energy product B·H of at least 40 MG·Oe at room temperature, and in some embodiments, the energy product B·H is at least 50 MG·Oe at room temperature. The average grain size may be about, or at most about 100, 50, 25, 10, 9, 8, 7, 6, 5, 4, 3, 2, 1, 0.5, 0.2, or 0.1 microns, including any intervening range.

In some preferred embodiments, the magnet cladding is formed from laser-based additive manufacturing or welding on the core magnet region. Laser-based additive manufacturing is advantageous to control grain size, grain texture, grain boundaries, and other microstructure features. An exemplary apparatus for laser-based additive manufacturing is a Renishaw (West Dundee, Illinois, USA) 500Q SLM printer with four pulsed infrared lasers with an in situ melt pool optical monitoring system.

An additively manufactured magnet cladding may be observed to have certain physical features that show additive manufacturing had been employed. When additive manufacturing is employed to make the magnet cladding, the magnet cladding may have an additively manufactured microstructure with scalloped build pattern, which has variation in phase boundaries in the build direction. In some embodiments, an additively manufactured microstructure has a crystallographic texture that is not solely oriented in an additive-manufacturing build direction. The additively manufactured microstructure may contain a plurality of dendrite layers having differing primary growth-direction angles with respect to each other.

An electromagnetic field can be beneficial during fabrication of the magnet cladding. The electromagnetic field may have advantages in terms of crystallographic structure, for example. See the section entitled "Microstructure Evolution and Control During Laser-Based Additive Manufacturing with Optional Electromagnetic Fields", later in this specification, for more detail. Also, U.S. Patent App. Publication No. 20220044851 A1, published on Feb. 10, 2022, is hereby incorporated by reference herein.

Nanofunctionalization, with the metal-containing grain-refining nanoparticles, is useful to control evolving microstructures producing fine grains. Nanofunctionalization also can be used to locally incorporate other elements, such as grain-growth-restriction elements or rare earth elements. Control of texture through the use of external magnetic fields can tailor the orientation of grains to produce aligned easy-axis texture, which is desirable for high demagnetization resistance. In some embodiments, field-assisted laser surface texturing incorporates grain-refining nanoparticles to induce heterogeneous nucleation of equiaxed grains which can be magnetically aligned in the highly undercooled region of the melt pool. The locations most vulnerable to demagnetization due to their misorientation to the magnetic flux in a motor can be selectively aligned in a more favorable direction, for example.

Some variations provide a method of making a cladded permanent magnet, the method comprising:

(i) providing a nanofunctionalized magnetic material feedstock comprising:
  (i)(a) from about 50 wt % to about 99.5 wt % of magnetic microparticles having an average microparticle effective diameter from about 1 micron to about 500 microns;
  (i)(b) from about 0.4 wt % to about 40 wt % of one or more rare earth elements; and
  (i)(c) from about 0.1 wt % to about 10 wt % of metal-containing grain-refining nanoparticles having an average nanoparticle effective diameter from about 1 nanometer to about 1000 nanometers,
  wherein at least 1 wt % of the metal-containing grain-refining nanoparticles are chemically and/or physically disposed on surfaces of the magnetic microparticles; and
(ii) additively manufacturing or otherwise processing the nanofunctionalized magnetic material feedstock to form a cladded permanent magnet comprising:
  (ii)(a) a core magnet region containing a core magnetic material; and
  (ii)(b) a magnet cladding containing a shell magnetic material, wherein the shell magnetic material comprises a magnetic compound that is chemically the same as the core magnetic material, one or more rare earth elements, and metal-containing grain-refining nanoparticles,
  wherein the magnet cladding is disposed on the core magnet region,
  wherein the magnet cladding is chemically distinct and physically distinct from the core magnet region, and
  wherein the magnet cladding has at least 10% higher ambient-temperature magnetic coercivity compared to the core magnet region, wherein the ambient-temperature magnetic coercivity is measured at 25° C.

In some methods, during step (ii), a magnetic field is applied to orient the easy axis of grains during solidification. Microseconds-long melting and solidification of small volumes occur consecutively, focusing the laser beam on different edges and corners while changing the applied magnetic field, to tailor the easy axis orientation.

The magnet cladding may contain additives in addition to the shell magnetic material. In some embodiments, the magnet cladding consists of, or consists essentially of, the shell magnetic material. In other embodiments, the magnet cladding contains (i) a magnetic compound that is chemically the same as the core magnetic material, (ii) one or more rare earth elements, (iii) metal-containing grain-refining nanoparticles, and (iv) one or more other additives for functional or ornamental reasons.

In some embodiments, the magnet cladding is thermally characterized by a magnetic coercivity $H_C$ at 180° C. of at least 4000 Oe. In various embodiments, the magnet cladding is thermally characterized by a magnetic coercivity $H_C$ at 180° C. of about, or at least about 1000, 2000, 3000, 4000, 5000, 6000, 7000, 8000, 9000, or 10000 Oe, including any intervening range (e.g., 3000-8000 Oe). These values are the magnetic coercivity of the cladding only, not the entire cladded permanent magnet.

In some embodiments, the cladded permanent magnet is thermally characterized by a magnetic coercivity $H_C$ at 180° C. of at least 1000 Oe. In various embodiments, the cladded permanent magnet is thermally characterized by a magnetic coercivity $H_C$ at 180° C. of about, or at least about 1000, 2000, 3000, 4000, 5000, 6000, 7000, 8000, 9000, or 10000 Oe, including any intervening range (e.g., 2000-5000 Oe).

In some embodiments of the cladded permanent magnet, the thermal coefficient of coercive force is at least about −0.60%/K, such as at least about −0.55%/K, at least about −0.50%/K, at least about −0.45%/K, or at least about −0.40%/K. Note that it is generally desirable to have a smaller magnitude (less negative) for the thermal coefficient of coercive force, so that at increasing temperatures, the magnetic coercivity does not drop as drastically. For example, −0.40%/K is preferred over −0.50%/K. At least −0.40%/K means −0.40%/K, −0.39%/K, −0.38%/K, etc. In various embodiments, the thermal coefficient of coercive force of the cladded permanent magnet is about, or at least about −0.60%/K, −0.59%/K, −0.58%/K, −0.57%/K, −0.56%/K, −0.55%/K, −0.54%/K, −0.53%/K, −0.52%/K, −0.51%/K, −0.50%/K, −0.49%/K, −0.48%/K, −0.47%/K, −0.46%/K, −0.45%/K, −0.44%/K, −0.43%/K, −0.42%/K, −0.41%/K, −0.40%/K, or −0.39%/K, including any intervening range.

The cladded permanent magnet disclosed herein has a high maximum operating temperature. In various embodiments, the cladded permanent magnet is characterized by the capability of operating effectively at a temperature of at least 150° C., at least 160° C., at least 170° C., at least 180° C., at least 190° C., or at least 200° C.

The cladded permanent magnet preferably has a room-temperature energy product B·H at 25° C. of at least about 50 MG·Oe, such as at least about 60 MG·Oe.

The cladded permanent magnet preferably has a high-temperature energy product B·H at 200° C. of at least about 30 MG·Oe, such as at least about 35 MG·Oe, at least about 40 MG·Oe, at least about 45 MG·Oe.

The cladded permanent magnet may have a curved shape or a prismatic shape, for example. The cladded permanent magnet may be fabricated to have any shape. In typical embodiments, the cladded permanent magnet is placed in, or fabricated as a component of, an electric motor. The cladded permanent magnet may be inscribed with an identifying mark, such as a patent number or a company or brand name, for example.

In some embodiments, the permanent-magnet structure is contained within a Halbach array. A Halbach array is an arrangement of permanent magnets that augments the magnetic field on one side of the array while cancelling the field to zero or near zero on the other side. Halbach arrays are conventionally assembled by bonding individually uniform texture and magnetic orientation magnets in a sequence of orientations that accentuates the field on one side of the magnet at the expense of the field on the opposing side. This conformation sacrifices field uniformity due to the large size (>1 mm) of the magnets used conventional Halbach arrays. By using the principles disclosed herein, a Halbach array configuration may be constructed at the micron scale, thereby enabling more-uniform, high-flux magnetic fields to be generated in the permanent magnet. A Halbach array may be configured to cause cancellation of magnetic components, resulting in a one-sided magnetic flux. An advantage of a one-sided flux distribution is that the field is twice as large on the side on which the flux is confined. Another advantage is the absence of a stray field on the opposite side, which helps with field confinement. Halbach arrays may be used for brushless direct-current motors, free-electron lasers, and wiggler magnets for particle accelerators.

The cladded permanent magnet, or regions thereof, may be analyzed using a wide variety of techniques. Standard measurement microscopy may be used, such as scanning electron microscopy (SEM), electron backscatter diffraction (EBSD), laser confocal scanning microscopy (LCSM), high-resolution optical microscopy, or automated profilometry. Magnetic measurement techniques such as vibrating-sample magnetometry (VSM) may be used. X-ray diffraction (XRD) and automated metallurgical polishing systems may be employed.

Microstructure Evolution and Control During Laser-Based Additive Manufacturing with Optional Electromagnetic Fields In some embodiments, magnetic properties are improved by controlling crystallographic orientation (texture) of the grains in addition to the magnetization orientation in the microstructure. This control is especially powerful when crystallographic texture and magnetic orientation are both tailored in a synergistic way during additive manufacturing. To this end, the grains may be crystallographically oriented in the (or a) direction that allows the highest remanent magnetization; simultaneously, a magnetic field may be applied to orient the magnetization in that same direction. The result is a magnet with optimal crystallographic and magnetic orientation and therefore the maximum energy product. As taught in this patent application, magnetic materials may also be optimized by 3D optimization of crystallographic texture in regions susceptible to demagnetization. By employing additive manufacturing, local thermal, magnetic, and stress fields may be manipulated in the production of magnetic materials having selected crystallographic texture(s) with location specificity.

Additive manufacturing provides control of crystallographic orientation during 3D printing. The resultant crystallographic orientation of a grain is dependent on several contributing thermodynamic driving forces. One such factor is the direction of the maximum thermal gradient, in which solidifying cubic crystals tend to preferentially grow with a <100> orientation. The thermal gradient can be controlled using a laser scan strategy by locally heating with a variety of spatially and/or temporally varying patterns. The formation of crystallographic texture can also be tailored during solidification and subsequent solid-state transformations through the application of an external magnetic field, potentially producing more texture uniformity with specified locality and direction. Tailorable magnetization may be achieved by varying local magnetic coercivity when using laser or electron beam heat treatment.

Additive manufacturing provides the opportunity to tailor local structure voxel-by-voxel in a serial, layered process. A processed voxel is the volume affected by heat input from the direct energy source in a layer-based approach, which volume includes the melt pool as well as the surrounding heat-affected zone. The solidification crystallographic texture may be controlled by the direction of heat extraction. In addition to the thermal field, a magnetic field may be applied during processing to control both crystallographic texture and magnetization orientation. The external magnetic field may be generated by means of an induction coil, multiple induction coils, a permanent magnet, or an array of permanent magnets, for example.

In this specification, additive manufacturing may be utilized in a wide variety of ways. In a cladded permanent magnet, the magnet cladding may be additively manufactured using laser melting and solidification of the nanofunctionalized magnetic material feedstock. Also, it is possible to additively manufacture the entire cladded permanent magnet, including the core magnet region, which may have been previously additively manufactured or may be additively manufactured in an integrated process. While the substrate in FIG. 1 is illustrated as having a simply rectangular geometry, that is solely for purposes of illustration. By using additive manufacturing, arbitrary 3D shapes may be fabricated. Additive manufacturing is also known as 3D printing. In this section, the discussion of microstructures and texture control may apply to any region of a cladded permanent magnet that is additively manufactured.

In additive manufacturing, the energy source may be a laser beam, an electron beam, or both a laser beam and an electron beam. The energy source preferably imposes a thermal gradient that melts a portion of the feedstock composition in a scan direction, rather than bulk melting the entire feedstock composition. In various embodiments, additive manufacturing uses a technique selected from the group consisting of selective laser melting, electron beam melting, laser engineered net shaping, selective laser sintering, direct metal laser sintering, integrated laser melting with machining, laser powder injection, laser consolidation, direct metal deposition, directed energy deposition, plasma arc-based fabrication, ultrasonic consolidation, electric arc melting, and combinations thereof.

In certain embodiments, the additive manufacturing process is selected from the group consisting of selective laser melting, energy-beam melting, laser engineered net shaping, and combinations thereof.

Selective laser melting utilizes a laser (e.g., Yb-fiber laser) to provide energy for melting. Selective laser melting is designed to use a high power-density laser to melt and fuse metallic powders together. The process has the ability to fully melt the metal material into a solid 3D part. A combination of direct drive motors and mirrors, rather than fixed optical lens, may be employed. An inert atmosphere is usually employed. A vacuum chamber can be fully purged between build cycles, allowing for lower oxygen concentrations and reduced gas leakage. Selective laser melting is a type of powder bed-based additive manufacturing.

Electron beam melting uses a heated powder bed of metal that is then melted and formed layer by layer, in a vacuum, using an electron beam energy source similar to that of an electron microscope. Metal powder is welded together, layer by layer, under vacuum. Electron beam melting is another type of powder bed-based additive manufacturing.

Laser engineering net shaping is a powder-injected technique operated by injecting metal powder into a molten pool of metal using a laser as the energy source. Laser engineered net shaping is useful for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication.

Direct metal laser sintering process works by melting fine powders of metal in a powder bed, layer by layer. A laser supplies the necessary energy and the system operates in a protective atmosphere, typically of nitrogen or argon.

Another approach utilizes powder injection to provide the material to be deposited. Instead of a bed of powder that is reacted with an energy beam, powder is injected through a nozzle that is then melted to deposit material. The powder may be injected through an inert carrier gas or by gravity feed. A separate shielding gas may be used to protect the molten metal pool from oxidation.

Directed energy deposition utilizes focused energy (either an electron beam or laser beam) to fuse materials by melting as the material is being deposited. Powder or wire feedstock can be utilized with this process. Powder-fed systems, such as laser metal deposition and laser engineered net shaping, blow powder through a nozzle, with the powder melted by a laser beam on the surface of the part. Laser-based wirefeed systems, such as laser metal deposition-wire, feed wire through a nozzle with the wire melted by a laser, with inert gas shielding in either an open environment (gas surrounding the laser), or in a sealed gas enclosure or chamber.

Powder bed-based additive manufacturing is preferred for its ability to produce near-net-shape products as well as the smaller tailorable voxel size (such as about 200 μm or less) compared to directed energy deposition (conventionally >500 μm).

Some embodiments utilize wire feedstock and an electron beam heat source to produce a near-net shape part inside a vacuum chamber. An electron beam gun deposits metal via the wire feedstock, layer by layer, until the part reaches the desired shape. Then the part optionally undergoes finish heat treatment and machining.

In some variations, additive manufacturing (e.g., selective laser melting or electron beam melting) is employed to fabricate a permanent magnet voxel by voxel and layer by layer, so that the magnetic orientation of each voxel may be independently aligned via applying a magnetic field during the solidification of each voxel. A "voxel" is a volumetric (3D) pixel. In additive manufacturing, there is solidification of individual voxels so that the magnetic field may be varied voxel-by-voxel if desired. A plurality of voxels forms a single layer having a thickness defined by the voxel height.

Additive manufacturing also enables site-specific control of the crystallographic orientation during three-dimensional (3D) printing. The solidification texture depends on crystal structure, lattice strain, and surface attachment kinetics, and is directionally dictated by a maximal thermal gradient during the phase transformation from liquid to solid. Thermal gradients may be controlled during selective laser melting using (a) a laser scan strategy, e.g. locally heating in a predetermined raster pattern and energy intensity and/or (b) an externally applied magnetic field to influence texture evolution. In some embodiments, the magnetic easy axis orientation aligns with a crystallographic orientation in which resistance to demagnetization is maximized. Using the principles of this disclosure, the magnetic performance of a permanent magnet may be improved by controlling crystallographic orientation (texture) of the grains in the microstructure of the permanent magnet. This technology is especially powerful when crystallographic texture control and magnetic orientation are combined during additive manufacturing. The result is a magnet which contains regions with different crystallographic and magnetic orientations, which may be optimized in various ways.

Some variations are predicated on favorable orientations of the magnetic easy axis within a magnet architecture. Preferred embodiments enable the control of solidification of additively manufactured or welded microstructures on the order of the single domain limit (e.g., about 1-3 microns) to maximize the resistance to demagnetization in addition to controlling the orientation of the magnetic easy axis.

In some embodiments, easy axis alignment is designed into regions of interest, such as surfaces or corners, to improve overall resistance to demagnetization in a bulk permanent magnet. This approach enables fabrication of magnets with a strong field on one side, while the field on the other side is close to zero, for example. Such region optimization is on a length scale (e.g., less than 500 microns) that is infeasible with conventional manufacturing methods which require serial assembly.

By improving the demagnetization resistance of magnetic architectures through tailored crystallographic textures, the mass and volume efficiency of magnets can be improved. This, in turn, reduces the necessary material mass for matching performance to improve motor efficiencies. In addition, the invention provides the capability to produce optimized magnet shapes which optimize field utility. The ability to use higher magnetic fields enables efficiency gains in permanent-magnet motors. All of these factors improve permanent-magnet motor efficiencies and decrease the overall cost to manufacture.

The "magnetic axis" is the straight line joining two poles of a magnetized body. The torque exerted on the magnet by a magnetic field in the direction of the magnetic axis equals 0. The "crystallographic texture" is the distribution of crystallographic orientations of a polycrystalline material. A "crystallographic orientation" is defined by the plane (Miller) indices of the lattice plane of a crystal.

There may be one region or many regions that are optimized within a permanent magnet. When there are multiple regions, the individual region-average magnetic axes and the individual region-average easy axes may vary spatially, such as different orientations in different corners of the structure. Regions may be bulk regions contained in the interior of the permanent-magnet structure and/or surface regions contained at the surface of the permanent-magnet structure.

The magnetic domain averages and easy axis averages may vary spatially—e.g., different orientations in different corners—in different areas of the permanent-magnet structure. The variations across regions may be regular or irregular.

Each metal-containing grain has a grain easy axis. If a magnetic domain is the same as a grain, as in some embodiments, then the grain easy axis is the same as the domain easy axis. But if a magnetic domain is larger than one grain (e.g., 5 grains), then the domain easy axis is dictated by easy axes of all individual grains in the magnetic domain. When there are multiple regions, there may be different compositions in those regions, including different types or amounts of metal-containing grains, for example. An example is a surface region with a different composition than a bulk region of the permanent-magnet structure.

The selection of components in the overall composition will be dependent on the desired magnet properties and should be considered on a case-by-case basis. Someone skilled in the art of material science or metallurgy will be able to select the appropriate materials for the intended use, based on the information provided in this disclosure.

A magnetic domain may contain an individual metal-containing grain. Typically, a magnetic domain contains multiple metal-containing grains. In some embodiments, the average magnetic domain size is about the same as the average grain size. In other embodiments, the average magnetic domain size is larger than the average grain size.

The average magnetic domain size may be from 1 micron to 1000 microns, for example. In some embodiments, the average magnetic domain size is from 10 microns to 10 millimeters.

The average grain size may be from 0.1 microns to 50 microns, for example. An exemplary average grain size is from about 1 micron to about 5 microns.

Grain sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

In some embodiments, the metal-containing grains are substantially equiaxed grains. In other embodiments, the metal-containing grains are substantially columnar grains or elongated grains. In certain embodiments, there are both substantially equiaxed grains and substantially columnar grains, in different locations. Grains may be surrounded by a grain boundary layer with a different composition and magnetic properties.

Control of both crystallographic texture and magnetization direction in permanent magnets may utilize combinations of magnetization direction and easy axis alignment (grain orientations). This control may augment magnetic field distribution and tailor the field shape generated by the permanent magnet. The voxel size of the controlled region may be 10 μm×10 μm×10 μm in size, for example, dependent on the additive-manufacturing, welding, or other method to control the local microstructure. In certain embodiments, single magnetic domains with uniform magnetic orientation exist in single grains which can be individually oriented crystallographically.

Interfaces between domains are susceptible to domain reversal (demagnetization) due to a lower barrier to nucleation. By matching a single magnetic domain with a single grain, the resistance to domain reversal within that grain is minimized, raising the energy barrier to nucleation of a reverse domain.

The local orientation of magnetization may be directionally tailored, even if unaligned with the easy axis, to shape the magnetic field generated by the permanent-magnet structure. Location-specified magnetization and crystallographic orientation, within various regions of the structure, may be optimized to account for the anticipated use conditions. For example, designated orientations may be desirable in locations of high susceptibility of demagnetization. These regions arise when demagnetizing field concentration is high or when orientations with respect to the field direction change rapidly, such as at corners.

Optimal easy axis orientations with respect to the external field preferably increase the energetic barrier to the nucleation of a reverse magnetic domain. Such optimization preserves magnetization in higher applied fields. In magnetocrystalline anisotropic materials, there may exist more than one easy axis dependent on crystal structure which describes the magneto-crystalline anisotropy. In the case of multiple easy axes, the texture configuration may be chosen in any of the equivalent directions, which may assist in texture control.

The magnetization and crystallographic orientations may or may not be co-aligned in the magnet, even when both of these orientations are controlled. In some preferred embodiments, the magnetic orientation and crystallographic orientation are co-aligned. In some embodiments, the magnetization and crystallographic orientations are controlled to achieve an average alignment angle between them.

The design of magnetic orientation and crystallographic orientation enables optimization of magnet properties in non-uniform demagnetizing fields present in nearly every permanent-magnet application. In an opposing demagnetizing field, magnetic orientations near the edges or surfaces of permanent-magnet structures become unaligned or at least become sub-optimal in their orientations. By selectively manipulating the local orientation in these regions of rapidly demagnetizing field orientation, to instead resist demagnetization, the ceiling for operating conditions (e.g., temperature and field strength) can be raised. Performance can be improved for demanding motor applications, especially electric vehicle propulsion.

In some embodiments, the magnetic-field orientation may be adjusted in the build direction. The magnetic-field orientation may be adjusted at every build layer, or may switch back and forth between two different orientations for successive layers, or may incrementally change angle as the build proceeds, as just a few examples of build strategies.

In some embodiments, the magnetic-field orientation is adjusted during solidification of the first melt layer. For example, after some voxels have been formed in a first melt layer, the magnetic-field orientation may be adjusted, after which more voxels are formed in the first melt layer.

In some embodiments, the magnetic-field orientation is selected to control voxel-specific magnetic axes within the plurality of individual voxels contained within the magnetic metal layer. In these or other embodiments, the magnetic-field orientation is selected to control voxel-specific crystallographic textures within the plurality of individual voxels contained within the magnetic metal layer.

A “voxel” is a volumetric (3D) pixel. A plurality of voxels forms a single layer having a thickness defined by the voxel height. In some embodiments, the individual voxels are defined by a characteristic voxel length scale selected from about 50 microns to about 1000 microns. In certain embodiments, the characteristic voxel length scale is selected from about 100 microns to about 500 microns. An exemplary voxel is on the order of 100 μm×100 μm×100 μm. Another exemplary voxel is on the order of 10 μm×10 μm×10 μm.

A voxel may be cubic in geometry, but that is not necessary. For example, a voxel may be rectangular or may have an irregular shape. For an arbitrary voxel geometry, there is a characteristic voxel length scale that is equivalent to the cube root of the average voxel volume. The characteristic voxel length scale may be about, at least about, or at most about 1, 2, 3, 4, 5, 6, 7, 8, 9, 10, 15, 20, 25, 30, 40, 50, 75, 100, 125, 150, 200, 250, 300, 350, 400, 450, 500, 600, 700, 800, 900, or 1000 microns, including all intervening ranges (e.g., 100-500 microns). The characteristic voxel length scale is typically a function of the laser or electron beam intensity, beam diameter, scan speed, and properties (e.g., kinematic viscosity) of the material being fabricated.

In preferred embodiments utilizing additive manufacturing, there is solidification of individual voxels and the magnetic field may be varied voxel-by-voxel, if desired.

Using a highly localized energy source, and potentially using different compositions during fabrication, small voxels of a structure can be created with specific crystal orientations and magnetic properties, independently of other voxels.

Depending on the intensity of the energy delivered, each voxel may be created by melting and solidification of a starting feedstock or by sintering or other heat treatment of a region of material, for example. During solidification, a molten form of a voxel produces one or more solid grains with individual crystal structures. In some embodiments, solidified voxels contain single grains. In other embodiments, solidified voxels contain a plurality of grains having some distribution of crystallographic orientations and magnetic orientations. Geometrically, an individual voxel may be the same size as an individual grain, or may be larger than an average grain size within a magnetic metal layer. In various embodiments, an average voxel contains about, at least about, or at most about 1, 1.5, 2, 2.5, 3, 4, 5, 6, 7, 8, 9, 10, 15, 20, 25, 50, 75, or 100 grains, including all intervening ranges.

When a voxel contains a plurality of grains each having its own crystallographic orientation and magnetic easy axis, the voxel will have a voxel-average crystallographic orientation and a voxel-average magnetic easy axis. In some embodiments, a voxel is configured such that all grains have the same or similar crystallographic orientations and/or magnetic easy axes. In other embodiments, a voxel is configured such that individual grains have different crystallographic orientations and/or magnetic easy axes.

A magnetic metal layer from additive manufacturing or welding has crystallographic texture arising from individual grains which, in turn, form voxels. There is a magnetic easy axis for each grain, an average magnetic easy axis for each voxel, and an average magnetic easy axis for the magnetic metal layer. Using the principles of this disclosure, there may be varying degrees of alignment between these hierarchical magnetic easy axes.

In certain embodiments, a voxel contains a plurality of grains with a narrow crystallographic orientation distribution along the easy axis of the crystal as well as co-aligned magnetic domains contained within each grain. This co-alignment produces the maximum total remanent magnetic flux for the voxel. In a larger structure with a plurality of voxels, there may be a narrow crystallographic orientation distribution along the easy axis as well as co-aligned magnetic domains contained within each voxel. This co-alignment produces the maximum total remanent magnetic flux for the structure.

The grain sizes may vary widely, such as from about 0.1 microns to about 1000 microns. In various embodiments, the average grain size (within a given voxel or within the overall structure) may be about, at least about, or at most about 0.1, 0.2, 0.3, 0.4, 0.5, 0.6, 0.7, 0.8, 0.9, 1, 1.5, 2, 3, 4, 5, 6, 7, 8, 9, 10, 15, 20, 25, 30, 35, 40, 45, 50, 75, 100, 125, 150, 200, 250, 300, 350, 400, 500, 600, 700, 800, 900, or 1000 microns.

When multiple layers are sequentially fabricated during additive manufacturing, the magnetic-field orientation may be adjusted in the build direction. In other words, the magnetic-field orientation may be different for one layer versus another layer, in addition to variations of the magnetic-field orientation within a layer (voxel-specific magnetic-field orientations).

The atomic structure of a crystal introduces preferential directions for magnetization. This is referred to as magnetocrystalline anisotropy. A "magnetic easy axis" is a direction inside a crystal, along which a small applied magnetic field is sufficient to reach the saturation magnetization. There can be a single easy axis or multiple easy axes. A "magnetic hard axis" is a direction inside a crystal, along which a large applied magnetic field is needed to reach the saturation magnetization. There will be a magnetic easy axis and a magnetic hard axis whether or not a magnetic field is actually being applied. The magnetic easy axis is different from the magnetic axis. A magnetic axis is only present when a magnetic field is actually applied, whereas a magnetic easy axis is a fixed property of a given crystalline material.

In some embodiments of the invention, the magnetic-field orientation may be selected to control voxel-specific magnetic easy axes within the plurality of individual voxels contained within the magnetic metal layer.

In some embodiments, the individual voxels are substantially magnetically aligned with each other, in reference to the magnetic easy axes of each voxel within a given magnetic metal layer. By "substantially magnetically aligned" is it meant that there is a standard deviation that is less than 25°, less than 20°, less than 10°, or less than 5°, calculated based on all of the magnetic easy axes within the magnetic metal layer. In certain embodiments, all magnetic easy axes are substantially aligned, such that the standard deviation is less than 2°, less than 10, less than 0.5°, less than 0.1°, or about 0°. Remanence measurements may be used to determine the alignment of magnetic easy axes. See McCurrie, "Determination of the degree of easy axis alignment in uniaxial permanent magnets from remanence measurements" *Journal of Applied Physics* 52, 7344 (1981), which is hereby incorporated by reference.

In some preferred embodiments, the magnetic-field orientation is selected to control voxel-specific magnetic axes as well as voxel-specific magnetic easy axes within the plurality of individual voxels contained within the magnetic metal layer, wherein the voxel-specific magnetic axes are substantially aligned with the voxel-specific magnetic easy axes for at least a portion of the magnetic metal layer. In certain embodiments, the voxel-specific magnetic axes are substantially aligned with the voxel-specific magnetic easy axes for all of the magnetic metal layer.

In other embodiments, the magnetic-field orientation is selected to control voxel-specific magnetic axes as well as voxel-specific magnetic easy axes within the plurality of individual voxels contained within the magnetic metal layer, wherein the voxel-specific magnetic axes are configured to be at angles with the voxel-specific magnetic easy axes for at least a portion of the magnetic metal layer.

In some embodiments, different feedstock compositions, each comprising one or more magnetic or magnetically susceptible materials, are exposed to the energy source. The crystallographic texture may be adjusted during the method by performing steps at different times using different feedstock compositions. Different feedstock compositions may be not only different species, but also different concentrations of the same species.

Optionally, different feedstock compositions, each comprising one or more magnetic or magnetically susceptible surface-modifying particles, are exposed to the energy source, and the crystallographic texture is adjusted during fabrication.

Some embodiments optimize the crystallographic texture site-specifically throughout the volume of the magnet. In contrast to conventionally processed magnetic materials with a single easy axis orientation, or a narrow distribution of easy axis orientations, texture-controlled permanent magnets disclosed herein may possess easy axis orientations tailored to resist demagnetizing fields in regions of high susceptibility of demagnetization. Such regions may exist where demagnetizing field concentration is high and/or where orientations with respect to the magnetic field direction change rapidly, such as at corners.

Interfaces between domains are susceptible to domain reversal (demagnetization) due to a relatively low barrier to nucleation. Optimal easy axis orientations with respect to the external magnetic field preferably increase the energy barrier to nucleation of a reverse magnetic domain, thereby preserving magnetization. For example, by matching a single magnetic domain with a single grain, the resistance to domain reversal within that grain is minimized, raising the energy barrier to nucleation of a reverse domain.

Additive manufacturing is not limited in principle to the number of solid layers that may be fabricated. The number of layers may be at least 1, at least 2, or at least 10, at least 100, or at least 1000, for example.

The plurality of solid layers may be characterized by an average layer thickness of at least 10 microns, such as about 10, 20, 30, 40, 50, 75, 100, 150, or 200 microns, for example.

Each solid layer may contain a number of voxels. In a special case for a substantially vertical build (e.g., a narrow column), there may be a single voxel per layer. The average number of voxels per layer may be about, at least about, or at most about 2, 3, 4, 5, 10, 20, 30, 40, 50, 100, 150, 200, 300, 400, 500, 600, 700, 800, 900, or 1000, including all intervening ranges, for example.

One or more solid layers may have a microstructure with equiaxed grains. A microstructure that has "equiaxed grains" means that at least 90 vol %, preferably at least 95 vol %, and more preferably at least 99 vol % of the metal alloy contains grains that are roughly equal in length, width, and height. In some embodiments, at least 99 vol % of the magnet contains grains that are characterized in that there is less than 25%, preferably less than 10%, and more preferably less than 5% standard deviation in each of average grain length, average grain width, and average grain height. Equiaxed grains may result when there are many nucleation sites arising from grain-refining nanoparticles contained in the microstructure.

In some embodiments, the grain-refining nanoparticles are lattice-matched to within ±5% compared to an otherwise-equivalent material containing the base particles but not the grain-refining nanoparticles. In certain embodiments, the grain-refining nanoparticles are lattice-matched to within ±2% or within ±0.5% compared to a material containing the base particles but not the grain-refining nanoparticles.

Preferably, the microstructure of the additively manufactured magnet is substantially crack-free. The avoidance of cracks can be important for magnets. For example, samarium-cobalt magnets are brittle and prone to cracking and chipping. Crack-free SmCo-based permanent magnets may be fabricated.

A magnet microstructure that is "substantially crack-free" means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. The non-desirable material disposed within the crack may itself contain a higher porosity than the bulk material, may contain a different crystalline (or amorphous) phase of solid, or may be a different material altogether, arising from impurities during fabrication, for example.

The magnet microstructure may be substantially free of porous defects, in addition to being substantially crack-free. "Substantially free of porous defects" means at least 99 vol % of the magnet contains no porous voids having an effective diameter of at least 1 micron.

Preferably, at least 80 vol %, more preferably at least 90 vol %, even more preferably at least 95 vol %, and most preferably at least 99 vol % of the magnet contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, and optionally to arrive at a final additively manufactured magnet that is substantially free of porous defects in addition to being substantially crack-free.

In additive manufacturing, post-production processes such as heat treatment, light machining, surface finishing, coloring, stamping, or other finishing operations may be applied. Also, several additive manufactured parts may be joined together chemically or physically to produce a final magnet.

EXAMPLES

Example 1: Cladded Permanent Magnets with NdFeB and Dy

Several experiments have been performed to evaluate laser-deposited Dy materials on NdFeB substrates. A feedstock consisting of a 100-micron-thick foil of Dy is set on the surface of a NdFeB substrate.

This set-up is illustrated in FIG. 1, which is a schematic diagram of a film or sheet containing Dy and metal-containing grain-refining nanoparticles disposed on NdFeB substrate.

Figure 2:
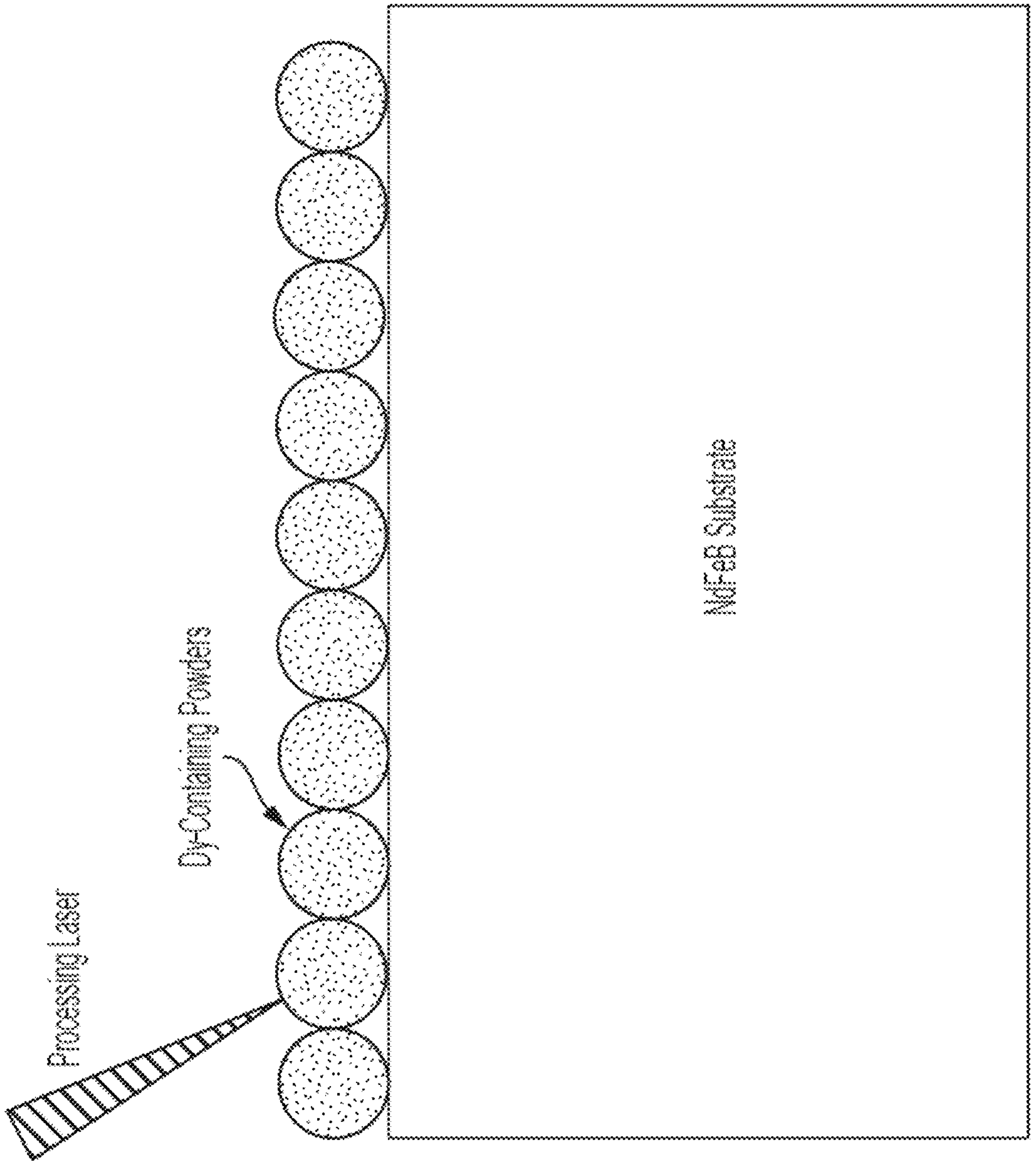
FIG. 2 is a schematic diagram of micropowders containing Dy and metal-containing grain-refining nanoparticles disposed on NdFeB substrate, in Example 1.

An alternative set-up is shown in FIG. 2, which is a schematic diagram of micropowders containing Dy and metal-containing grain-refining nanoparticles disposed on a NdFeB substrate.

FIG. 3 is a schematic diagram of a cladded permanent magnet in which a shell containing Dy surrounds the NdFeB substrate.

FIG. 4 is a schematic diagram of a cladded NdFeB permanent magnet in which enhanced corner regions contain Dy.

Laser processing of the surface melts and solidifies the materials to produce a cladded surface rich in Dy. By varying the laser parameters used, such as power or hatch distance, the profile of the cladding can be changed on the surface of the substrate, including depth of penetration and width. The regions to be cladded may be those regions most vulnerable to demagnetization, such as the edges and vertices (corners) of the magnet. Other areas of the magnet may be either unprocessed or processed with a different material.

Figure 5A:
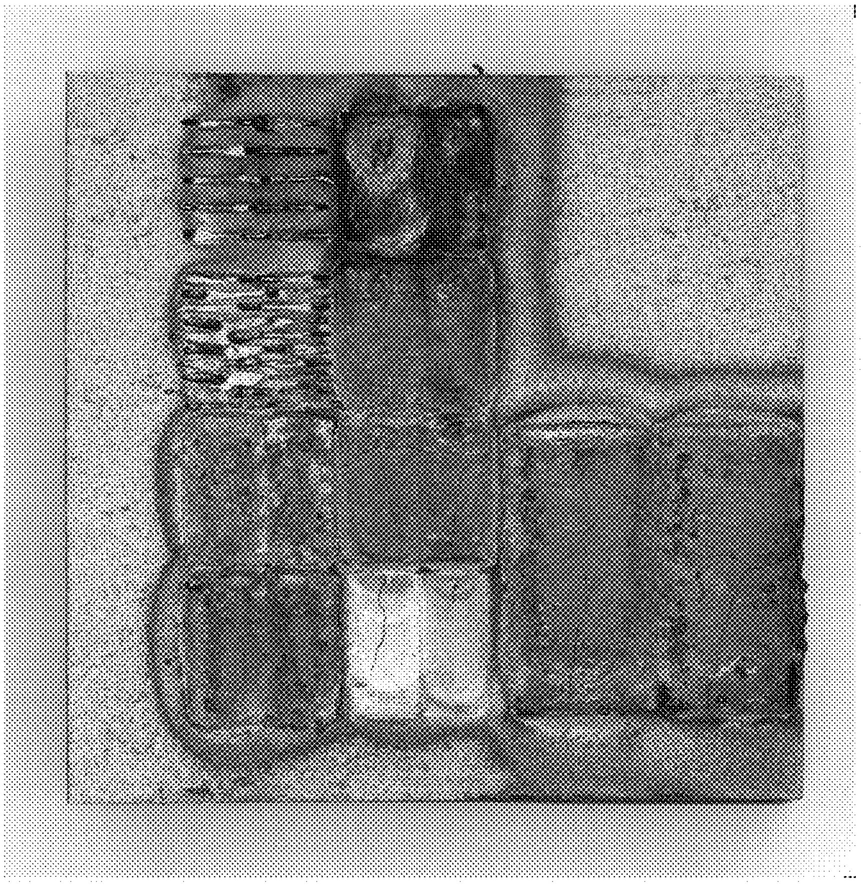
FIG. 5A shows an optical photograph of experimentally laser-clad Dy foil on a NdFeB substrate, in Example 1.

FIG. 5A shows an optical photograph of experimentally laser-clad Dy foil on a NdFeB substrate.

Figure 5B:
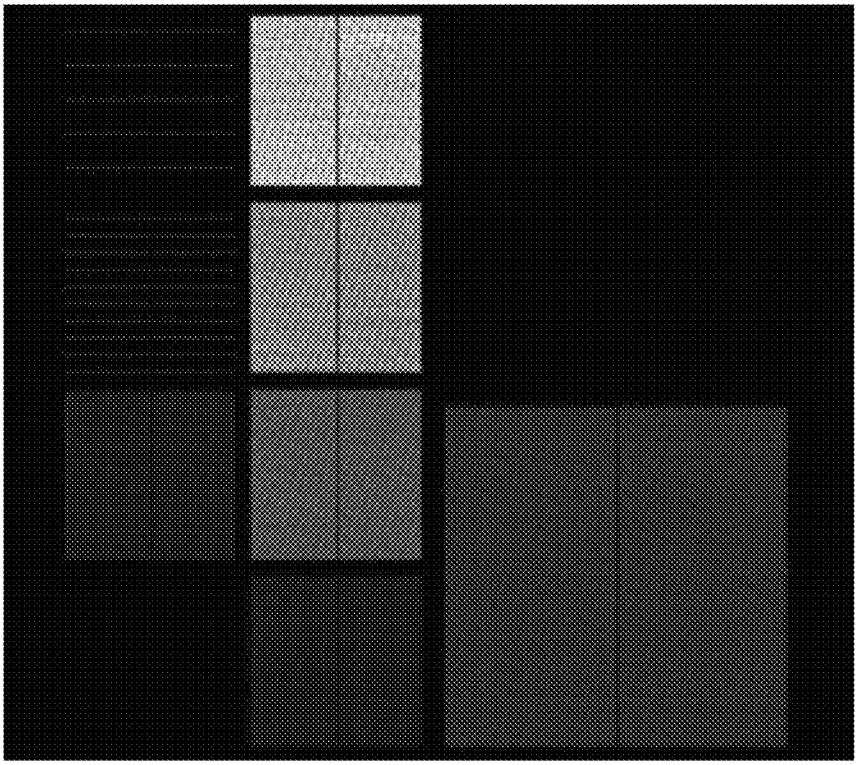
FIG. 5B shows an in situ IR monitoring image of laser power on the NdFeB surface, revealing differences in laser scanning parameters, in Example 1.

FIG. 5B shows an in situ IR monitoring image of laser power on the NdFeB surface, revealing differences in laser scanning parameters.

Figure 6A:
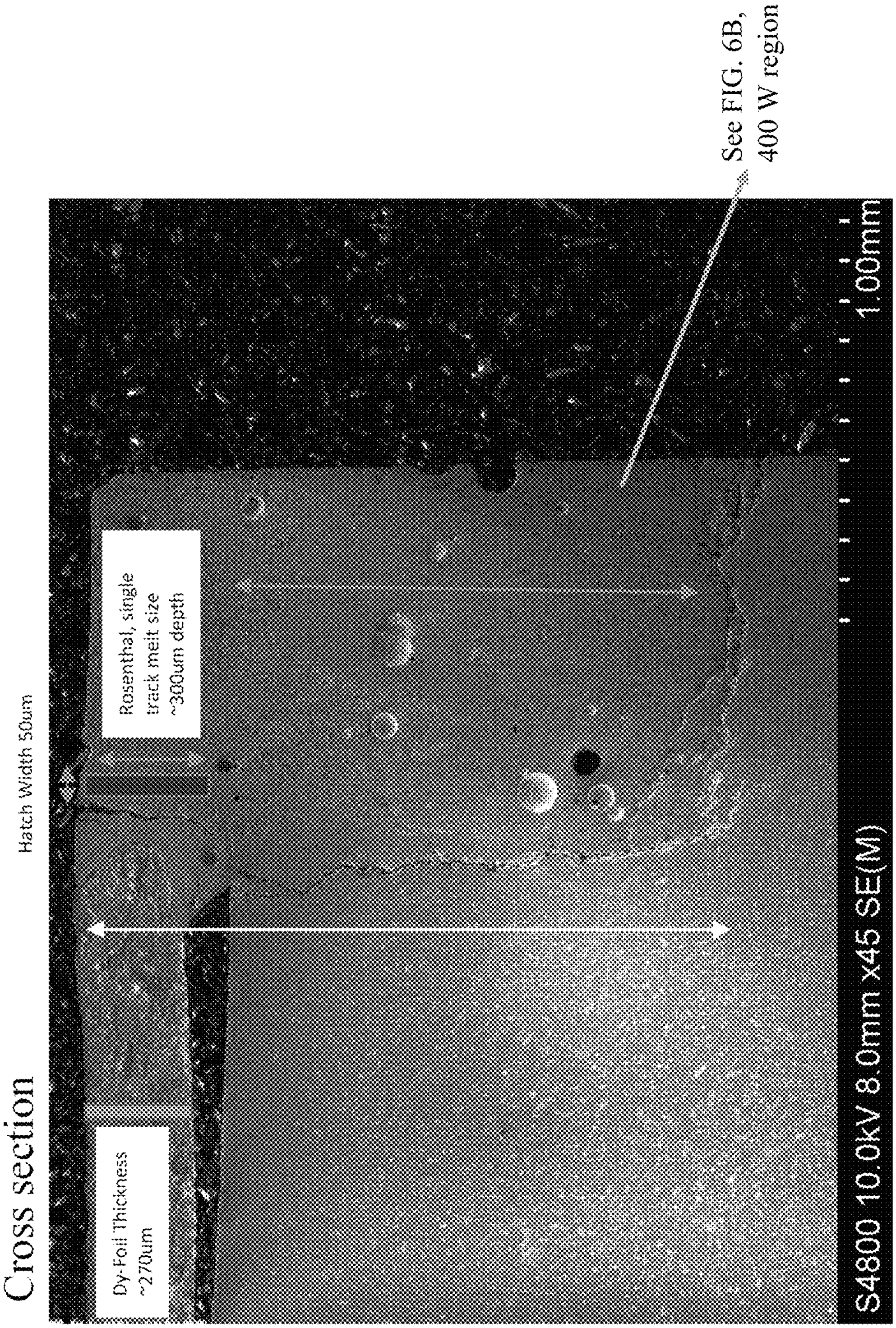
FIG. 6A is a scanning electron microscope (SEM) image (scale bar=1 millimeter) showing the Dy cladding cross section, in Example 1.

FIG. 6A is a scanning electron microscope (SEM) image (scale bar=1 millimeter) showing the Dy cladding cross section.

Figure 6B:
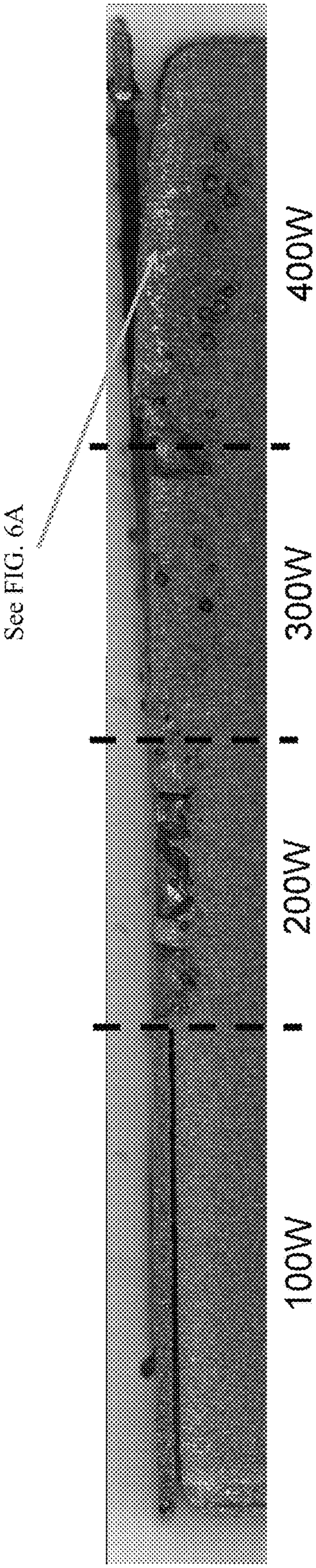
FIG. 6B is an optical photograph showing the Dy cladding cross section, in Example 1.

FIG. 6B is an optical photograph showing the Dy cladding cross section.

Figure 7A:
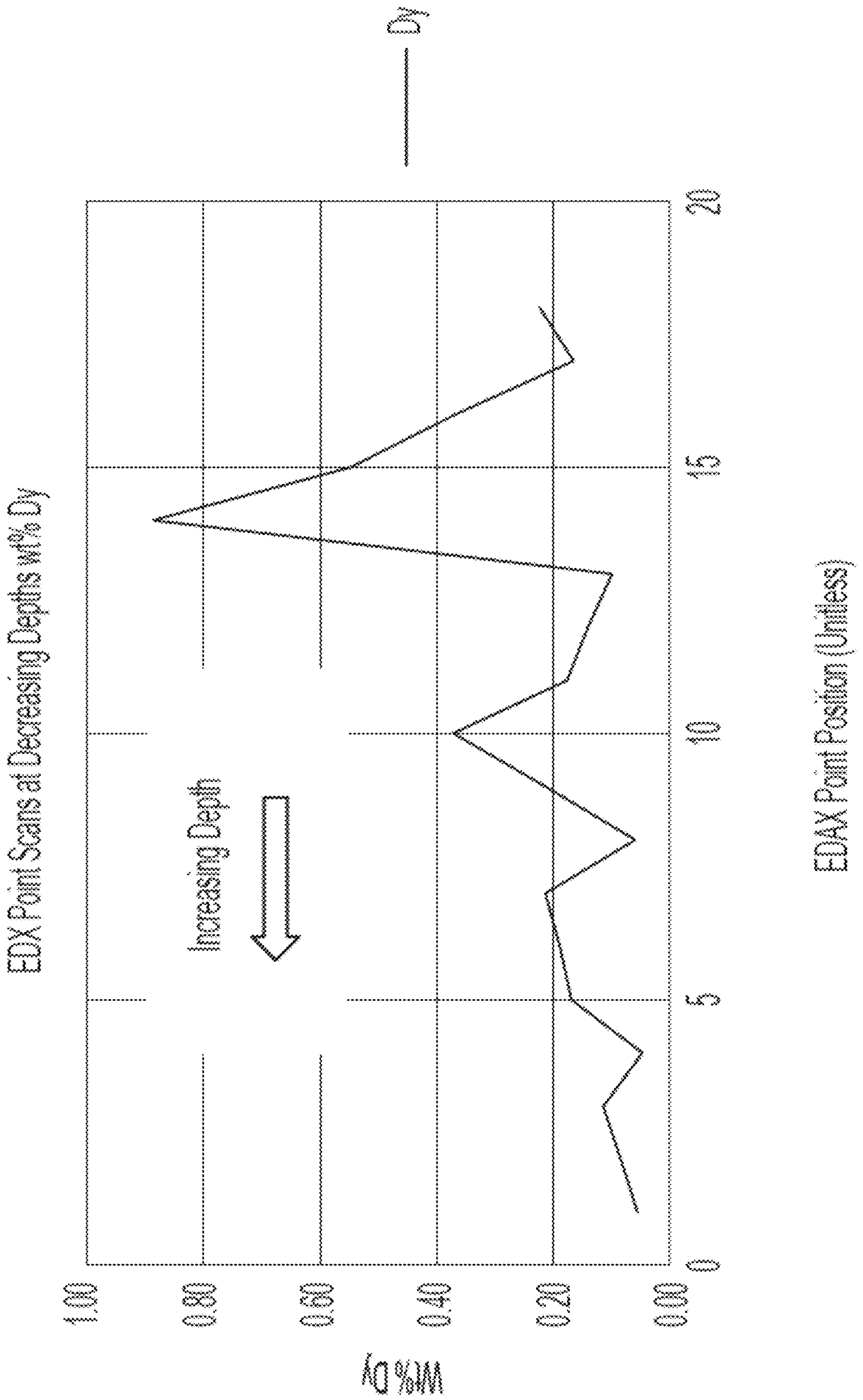
FIG. 7A is a graph showing the Dy concentration profile into the depth of the substrate, in Example 1. The x-axis is the point position of the EDAX instrument.

FIG. 7A is a graph showing the Dy concentration profile into the depth of the substrate. The x-axis is the point position of the EDAX instrument, and is unitless. FIG. 7A shows a gradient of composition within the weld from about 80 wt % Dy near the top of the melt to less than about 10 wt % Dy near the interface region.

Figure 7B:
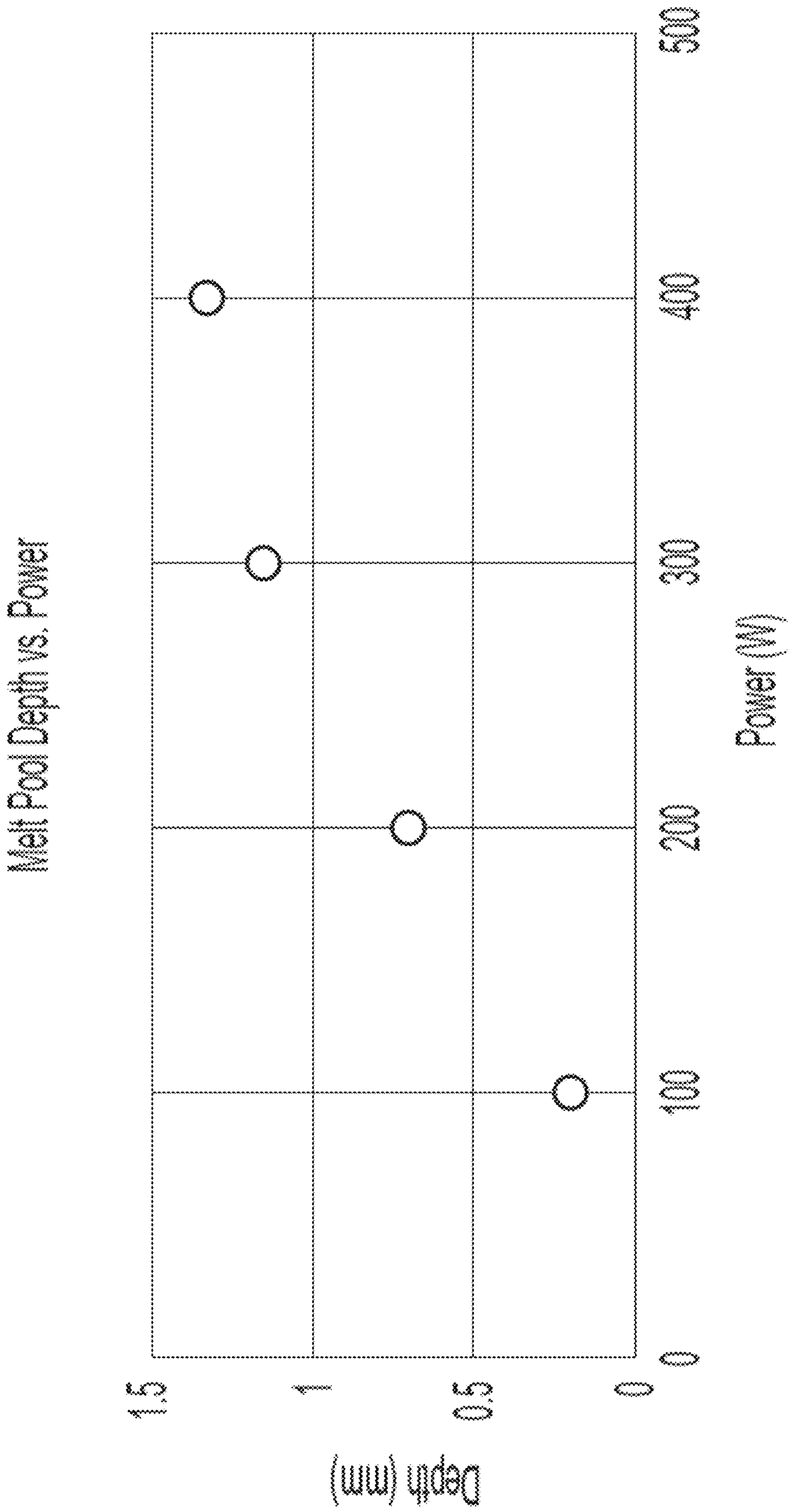
FIG. 7B is a graph showing the total measured depth of the melt pool, in Example 1.

FIG. 7B is a graph showing the total measured depth (in millimeters) of the melt pool, as a function of power in watts (W).

Analysis of these profiles show the variation of melting depth with power in different sections of the surface. Dy content is measured at various depths using energy-dispersive X-ray spectroscopy (EDAX). The fully molten depths of these profiles exceed what would be feasible in grain-boundary diffusion limited by diffusion rates. Site specificity of laser processing allows for both patterning and variation of profiles across the process surface, which can be optimized for the given application. For instance, in a motor, complex flux pathways may increase the need for higher coercivity and thus higher concentrations of Dy in certain sections of the magnet (e.g., at the trailing edge of the rotor).

Figure 8A:
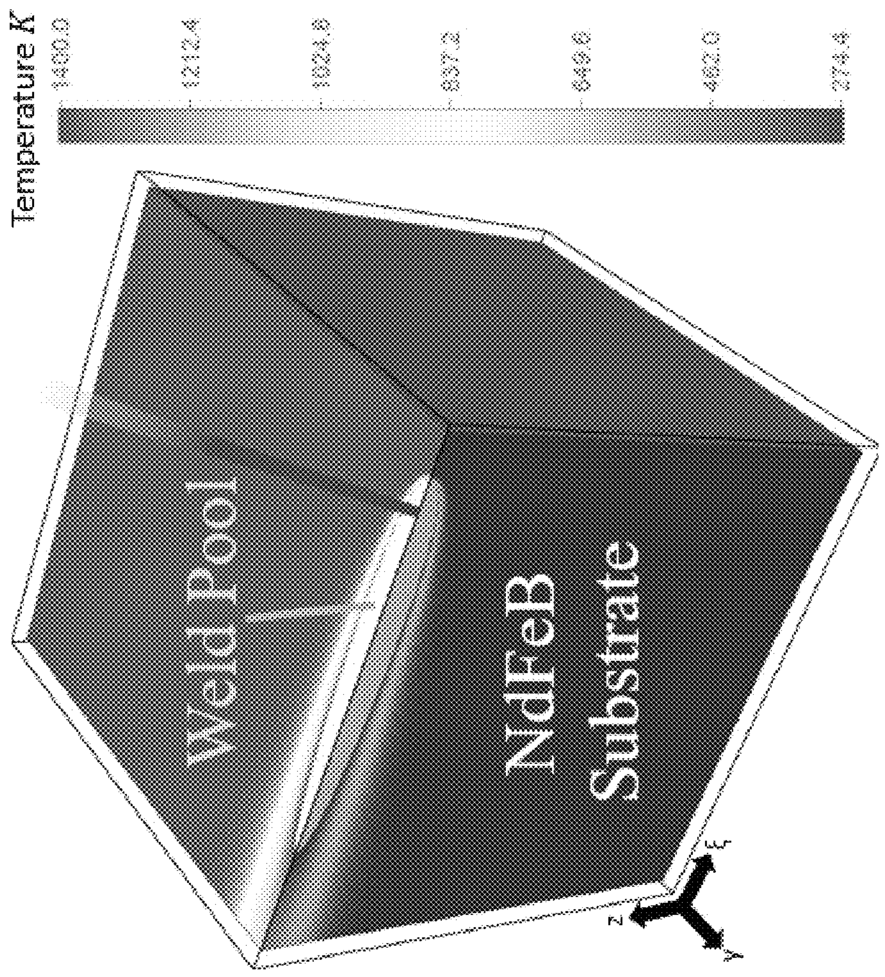
FIGS. 8A-8C depict the results of a Rosenthal welding model for various welding parameters on NdFeB substrates, in Example 1.
Figure 8B:
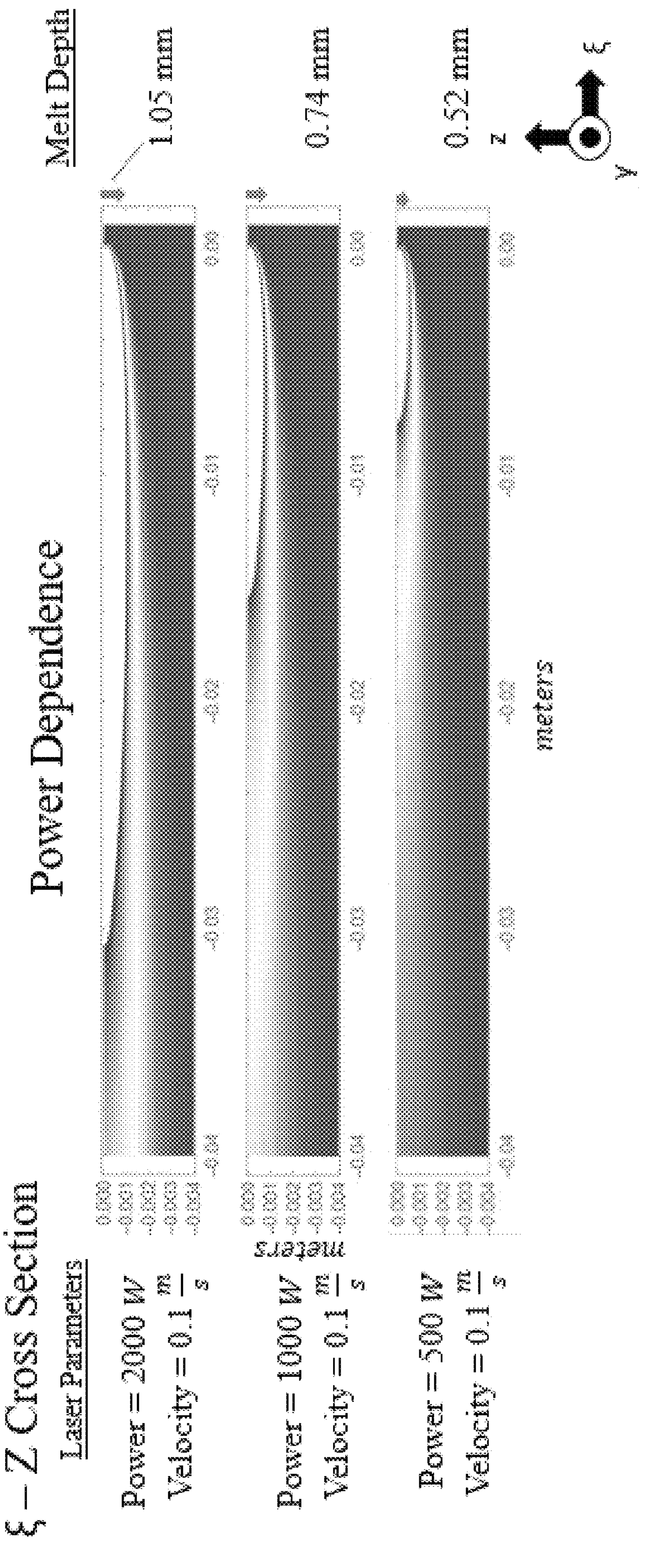
Figure 8C:
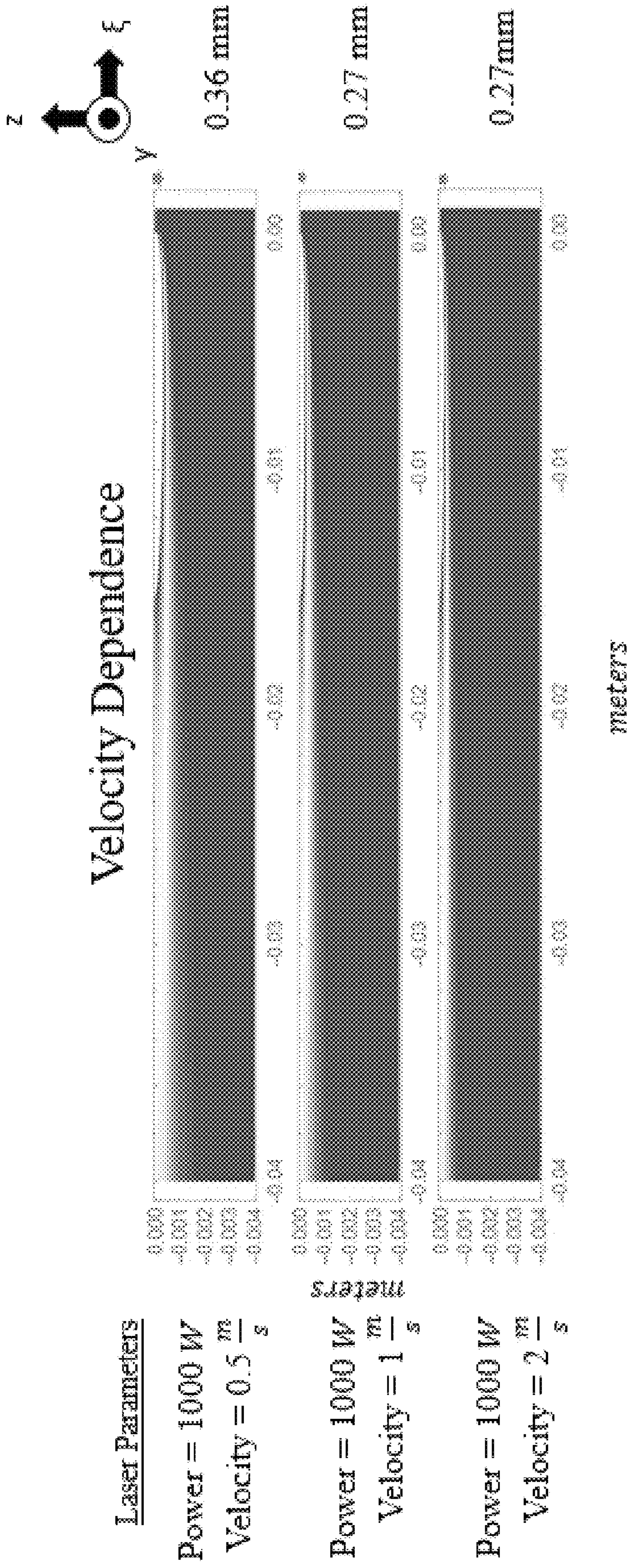

Welding models show how the laser parameters may be modified to produce various melting depths according to input scan parameters. FIGS. 8A, 8B, and 8C depict the results of a Rosenthal welding model for various welding parameters on NdFeB substrates. Weld-pool analysis gives laser power-velocity parameters that can be optimized to tailor melting depths on the order of $<100$ μm to 1 mm. This optimization can tailor demagnetization-susceptible structures in surface-mounted NdFeB.

Figure 9A:
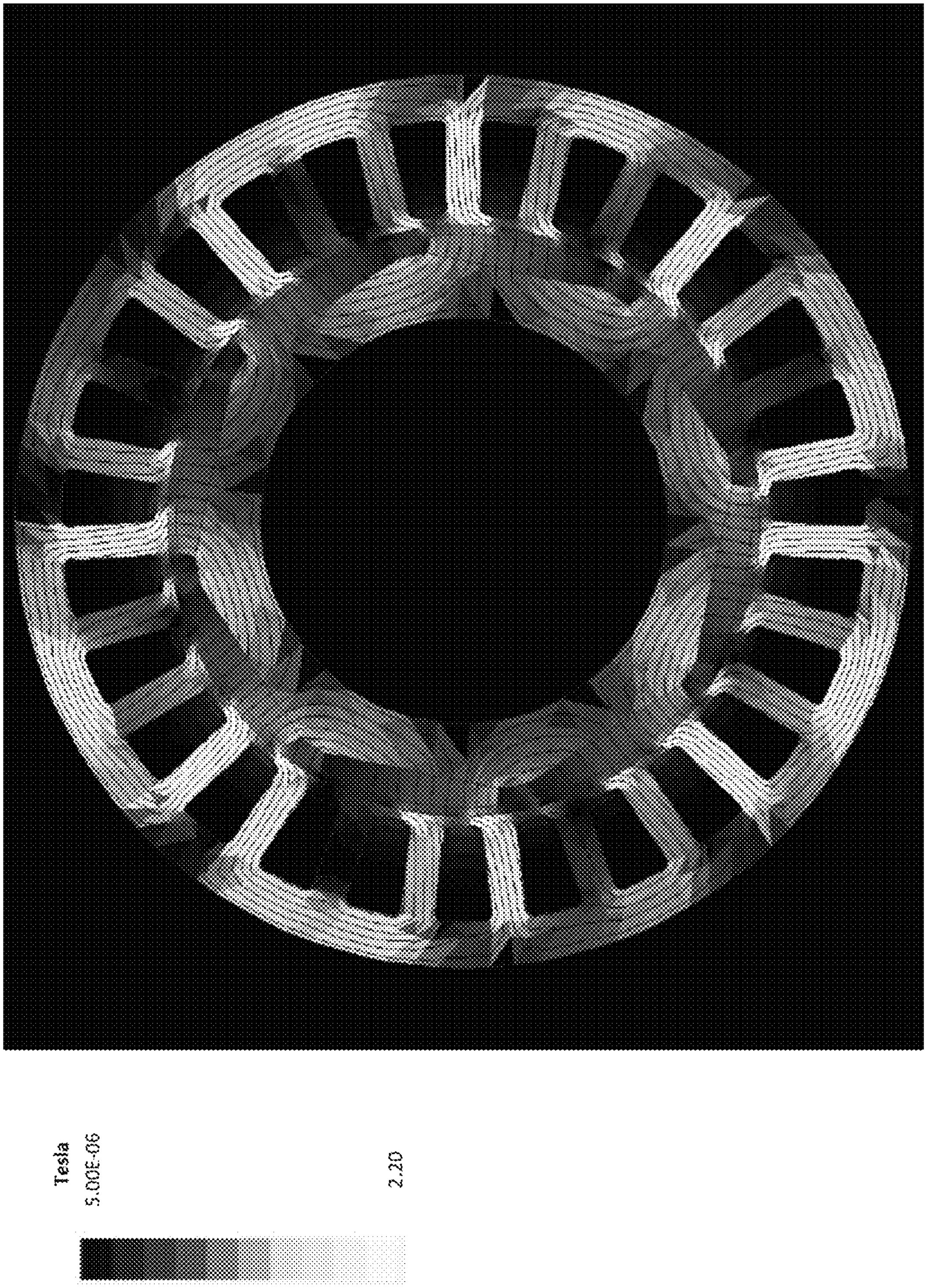
FIG. 9A is a magnetic and thermal model of a surface-mounted NdFeB permanent magnet N35SH motor (100 kW), showing the instantaneous flux density distribution at 150° C., in Example 1.

Magnetic motor modeling is also performed to identify areas of demagnetization. FIG. 9A is a magnetic and thermal model of a surface-mounted NdFeB permanent magnet N35SH motor (100 kW), showing the instantaneous flux density distribution at 150° C. FIG. 9A shows that the flux distribution across the motor at a given time instant is inhomogeneous. Critically, the flux distribution in the magnet itself is inhomogeneous, especially at peak torque conditions as shown. These conditions lead to demagnetization, both partially and fully, across the magnet—especially concentrated at the trailing edge of the system (see FIG. 9B).

Figure 9B:
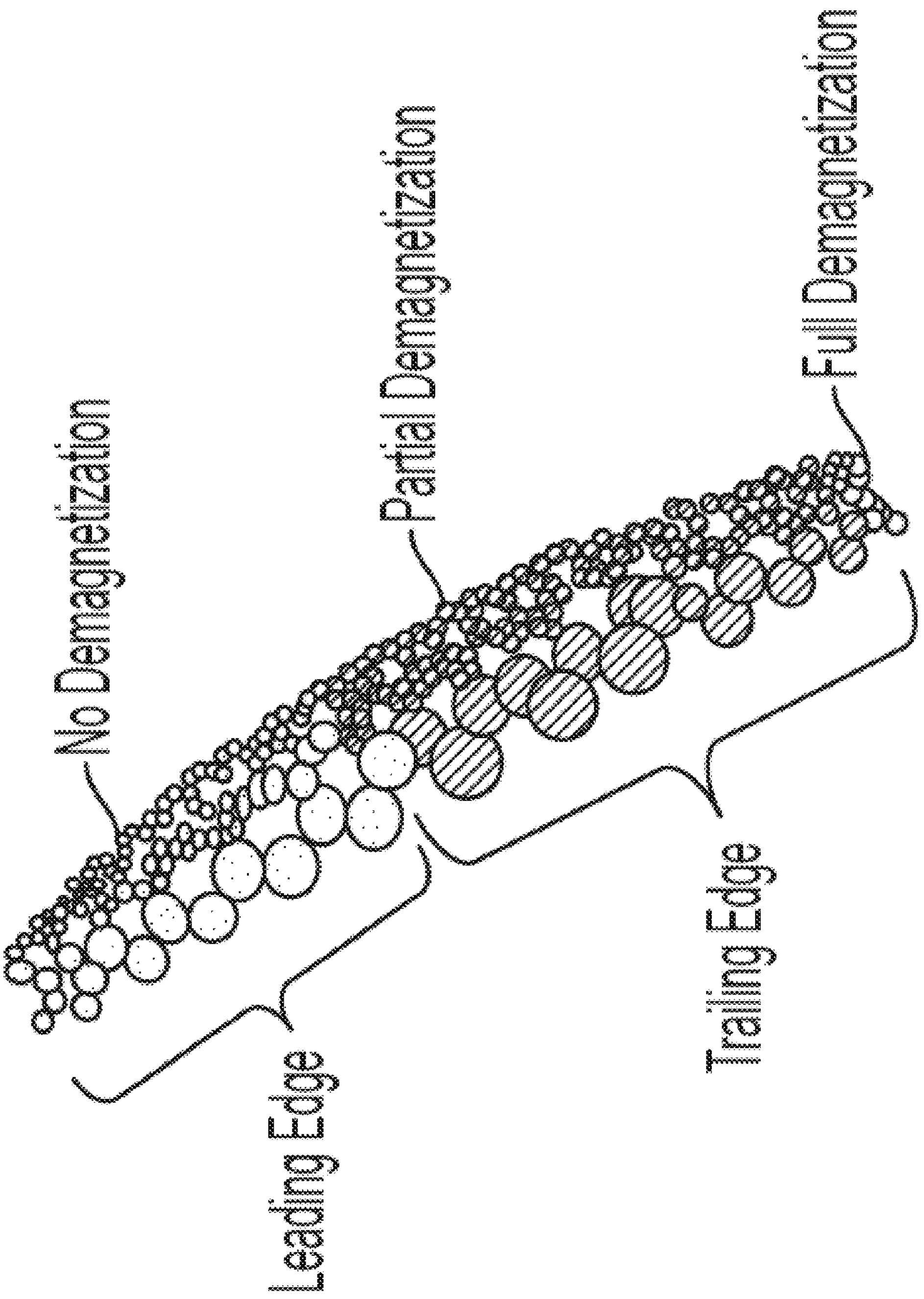
FIG. 9B depicts regions of partial demagnetization (48% of magnet) and full demagnetization (2% of magnet) in the surface-mounted NdFeB permanent magnet of Example 1.

FIG. 9B depicts regions of partial demagnetization (48% of magnet) and full demagnetization (2% of magnet) in the surface-mounted NdFeB permanent magnet.

In this motor architecture, the magnetic coercivity may be increased in the regions susceptible to partial or full demagnetization, as identified through modeling. The magnetic coercivity is increased by depositing rare earth elements on the surface to increase the stability to higher operating temperatures and opposing magnetic fields.

Example 2: NdFeB Permanent Magnet Microstructures from Laser-Based Additive Manufacturing Unmodified NdFeB micropowders are sintered and also additively manufactured, as controls. Then, the NdFeB micropowders are subjected to laser-based additive manufacturing along with zirconium diboride ($ZrB_2$), or with zirconium carbide (ZrC), or with copper (Cu).

Powders of NdFeB (FIG. 10) are nanofunctionalized with various species and processed with additive manufacturing using conventional selective laser melting equipment. Microstructures of different alloys (FIGS. 12 to 15) are imaged using electron backscatter diffraction (EBSD) to determine grain size and are compared to grain structures of sintered NdFeB magnets (FIG. 11).

Figure 10:
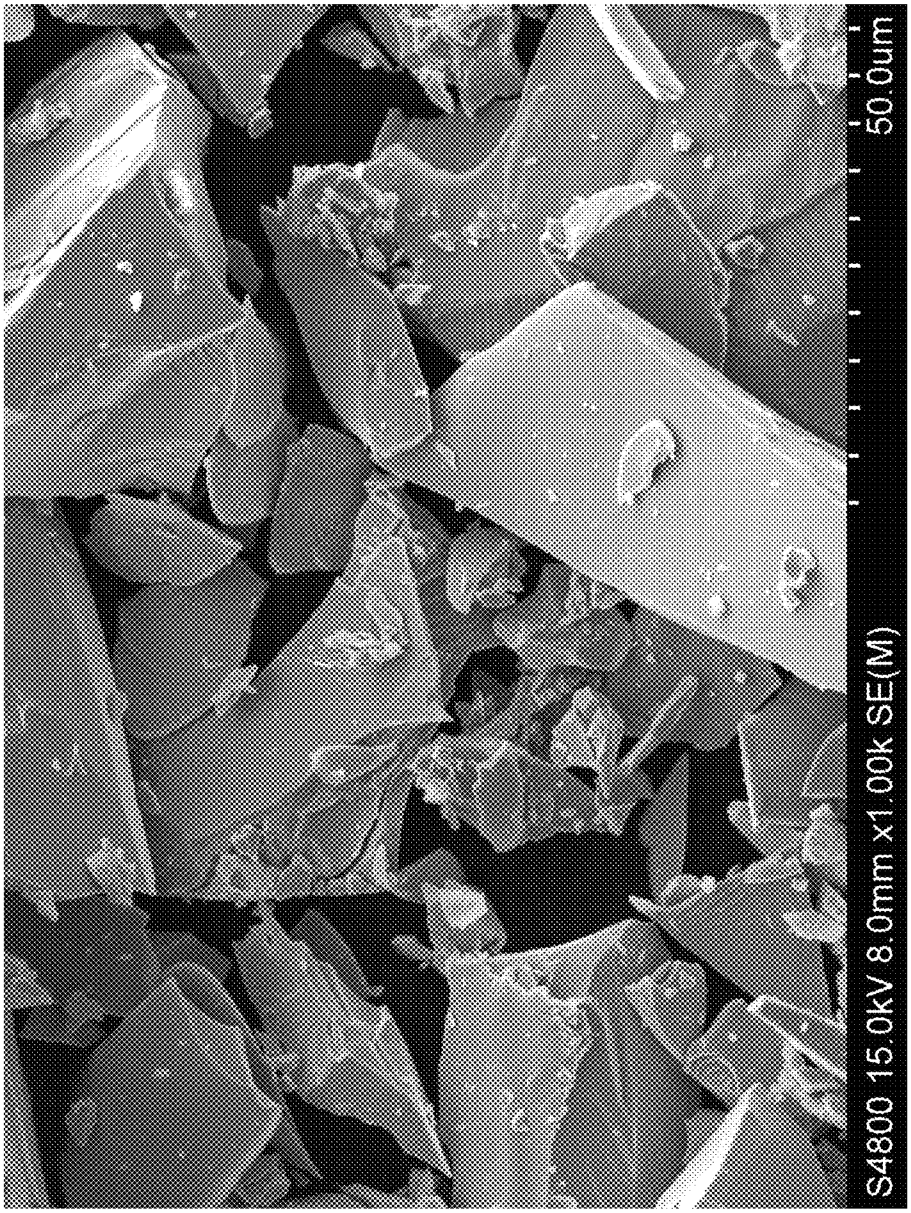
FIG. 10 is a SEM image of NdFeB micropowders (unmodified) (scale bar=50 microns), in Example 2.

FIG. 10 is a SEM image of NdFeB micropowders (unmodified) (SEM scale bar=50 microns).

Figure 11:
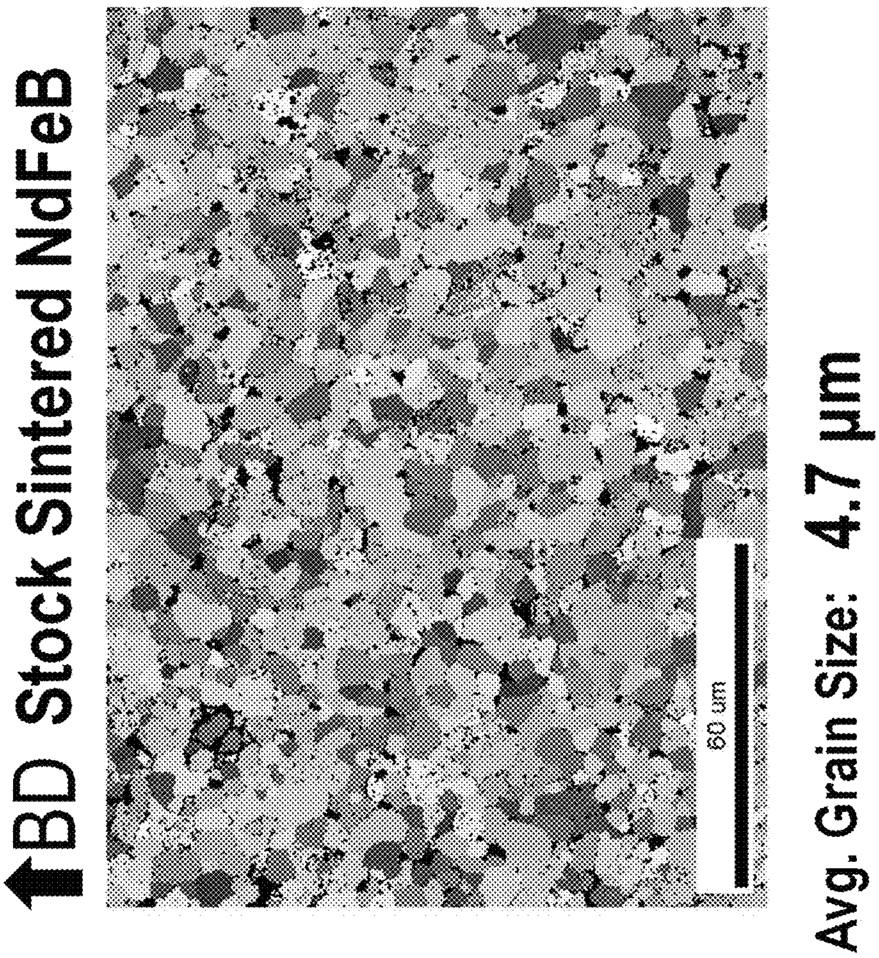
FIG. 11 is an inverse pole figure showing grains of sintered NdFeB micropowders (unmodified) (scale bar=60 microns), in Example 2.

FIG. 11 is an inverse pole figure showing grains of sintered NdFeB micropowders (unmodified) (scale bar=60 microns). The average grain size is about 4.7 microns.

Figure 12:
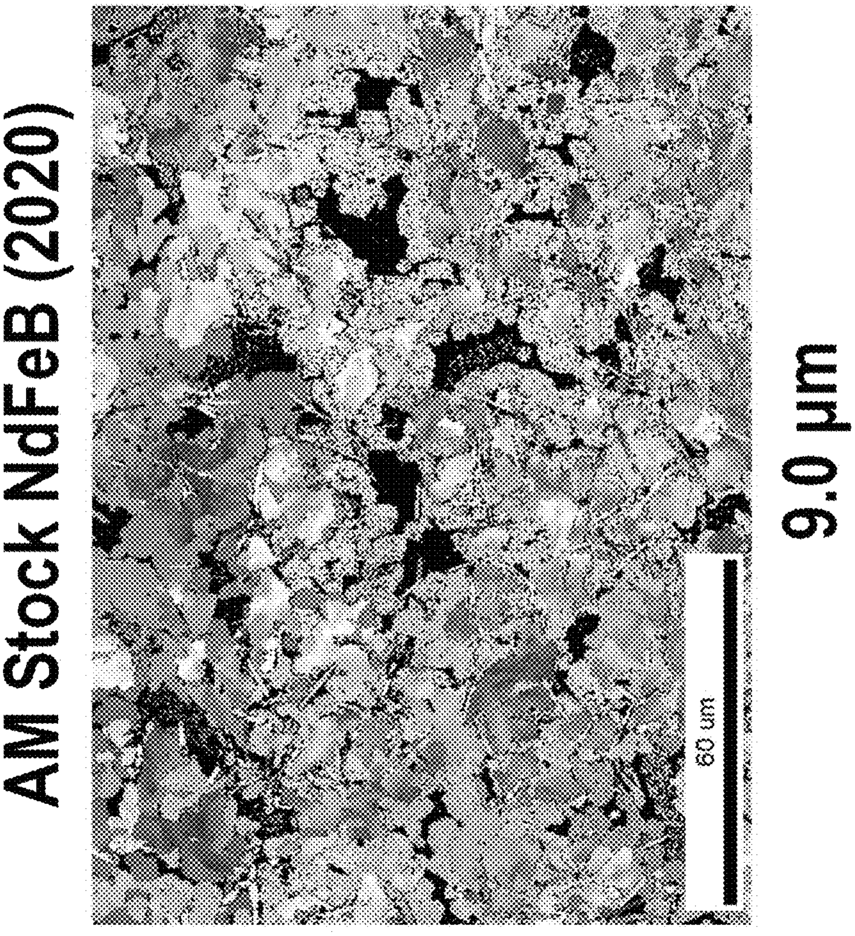
FIG. 12 is an inverse pole figure showing grains of laser-based additively manufactured NdFeB micropowders (unmodified) (scale bar=60 microns), in Example 2.

FIG. 12 is an inverse pole figure showing grains of laser-based additively manufactured NdFeB micropowders (unmodified) (scale bar=60 microns). The average grain size is about 9.0 microns.

Figure 13:
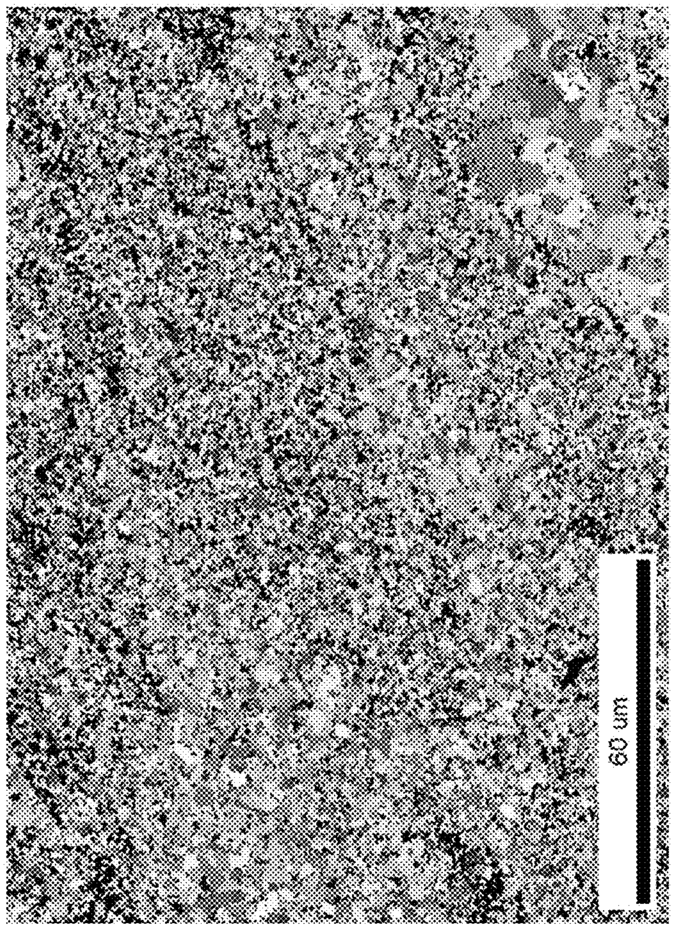
FIG. 13 is an inverse pole figure showing grains of laser-based additively manufactured NdFeB micropowders nanofunctionalized with $ZrB_2$ as grain-refining nanoparticles (scale bar=60 microns), in Example 2.

FIG. 13 is an inverse pole figure showing grains of laser-based additively manufactured NdFeB micropowders nanofunctionalized with $ZrB_2$ as grain-refining nanoparticles (scale bar=60 microns). The average grain size is about 1.8 microns.

Figure 14:
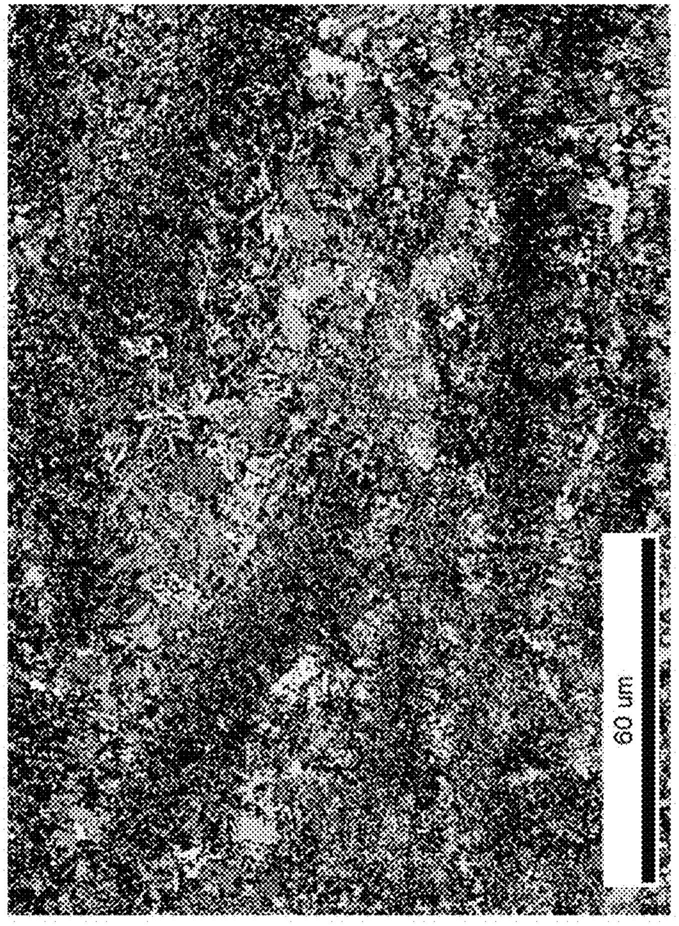
FIG. 14 is an inverse pole figure showing grains of laser-based additively manufactured NdFeB micropowders nanofunctionalized with ZrC as grain-refining nanoparticles (scale bar=60 microns), in Example 2.

FIG. 14 is an inverse pole figure showing grains of laser-based additively manufactured NdFeB micropowders nanofunctionalized with ZrC as grain-refining nanoparticles (scale bar=60 microns). The average grain size is about 1.2 microns.

Figure 15:
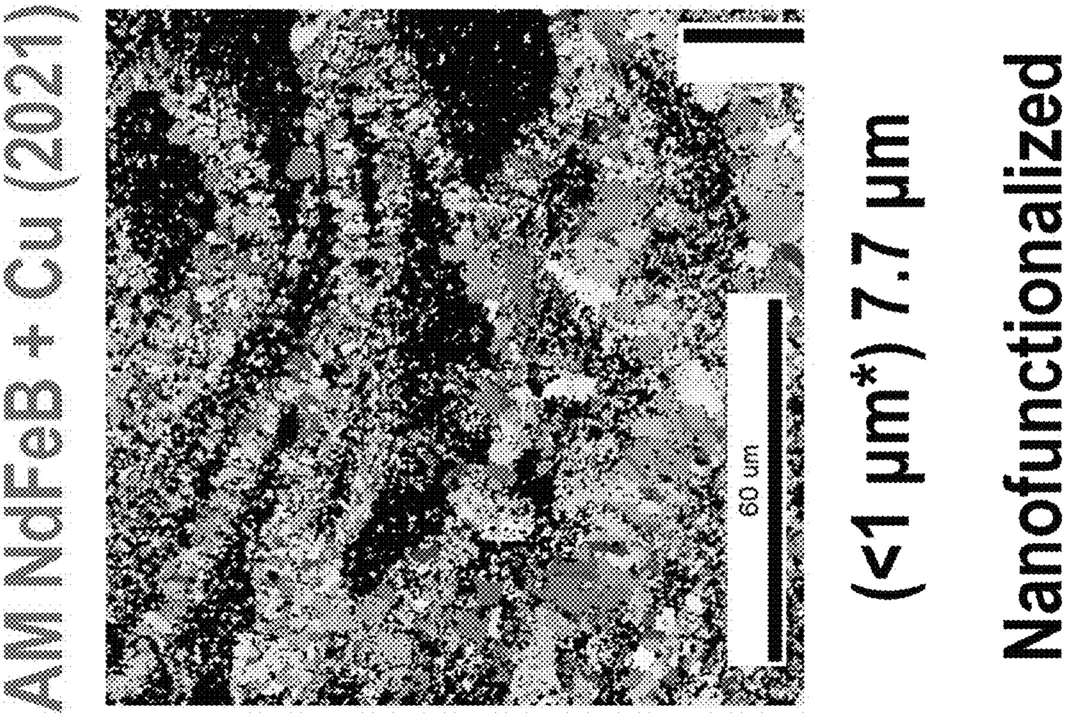
FIG. 15 is an inverse pole figure showing grains of laser-based additively manufactured NdFeB micropowders nanofunctionalized with Cu as a grain grain-growth-restriction agent (scale bar=60 microns), in Example 2.

FIG. 15 is an inverse pole figure showing grains of laser-based additively manufactured NdFeB micropowders nanofunctionalized with copper (Cu) as a grain grain-growth-restriction agent (scale bar=60 microns). In the image of FIG. 15, the copper concentration is higher in the top region compared to the bottom region. Laser processing of the surface melts and solidifies the copper particles to intentionally produce a top region relatively rich in Cu. The average grain size is about 7.7 microns in the lower region in which, it is believed, insufficient copper is present to significantly restrict grain growth. The average grain size is less than 1 micron in the upper region in which, it is believed, copper has significantly restricted grain growth.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A nanofunctionalized magnetic material feedstock comprising:

(a) from about 50 wt % to about 99.5 wt % of magnetic microparticles having an average microparticle effective diameter from about 1 micron to about 500 microns;

(b) from about 0.4 wt % to about 40 wt % of one or more rare earth elements; and (c) from about 0.1 wt % to about 10 wt % of metal-containing grain-refining nanoparticles having an average nanoparticle effective diameter from about 1 nanometer to about 1000 nanometers, wherein at least 1 wt % of said metal-containing grain-refining nanoparticles are chemically and/or physically disposed on surfaces of said magnetic microparticles.

2. The nanofunctionalized magnetic material feedstock of claim 1, wherein said magnetic microparticles are a magnetic material selected from the group consisting of NdFeB, DyFeB, SmCo, AlNiCo, MnAl, FeN, $Fe_3O_4$, and combinations thereof.

3. The nanofunctionalized magnetic material feedstock of claim 1, wherein said magnetic microparticles are substantially spherical.

4. The nanofunctionalized magnetic material feedstock of claim 1, wherein said magnetic microparticles are non-spherical.

5. The nanofunctionalized magnetic material feedstock of claim 1, wherein said average microparticle effective diameter is about 100 microns or less.

6. The nanofunctionalized magnetic material feedstock of claim 1, wherein said average microparticle effective diameter is about 10 microns or less.

7. The nanofunctionalized magnetic material feedstock of claim 1, wherein said average nanoparticle effective diameter is about 100 nanometers or less.

8. The nanofunctionalized magnetic material feedstock of claim 1, wherein said average nanoparticle effective diameter is about 10 nanometers or less.

9. The nanofunctionalized magnetic material feedstock of claim 1, wherein at least 10 wt % of said metal-containing grain-refining nanoparticles are chemically and/or physically disposed on surfaces of said magnetic microparticles.

10. The nanofunctionalized magnetic material feedstock of claim 1, wherein at least 50 wt % of said metal-containing grain-refining nanoparticles are chemically and/or physically disposed on surfaces of said magnetic microparticles.

11. The nanofunctionalized magnetic material feedstock of claim 1, wherein essentially all of said metal-containing grain-refining nanoparticles are chemically and/or physically disposed on surfaces of said magnetic microparticles.

12. The nanofunctionalized magnetic material feedstock of claim 1, wherein said metal-containing grain-refining nanoparticles form a continuous coating on said magnetic microparticles.

13. The nanofunctionalized magnetic material feedstock of claim 1, wherein said metal-containing grain-refining nanoparticles form a discontinuous coating on said magnetic microparticles.

14. The nanofunctionalized magnetic material feedstock of claim 13, wherein said discontinuous coating has a surface coverage from about 1% to about 99% on said magnetic microparticles.

15. The nanofunctionalized magnetic material feedstock of claim 13, wherein said discontinuous coating has a surface coverage from about 10% to about 50% on said magnetic microparticles.

16. The nanofunctionalized magnetic material feedstock of claim 1, wherein said nanofunctionalized magnetic material feedstock comprises at least about 1 wt % to about 10 wt % said metal-containing grain-refining nanoparticles.

17. The nanofunctionalized magnetic material feedstock of claim 1, wherein said nanofunctionalized magnetic material feedstock comprises at least about 5 wt % to about 10 wt % said metal-containing grain-refining nanoparticles.

18. The nanofunctionalized magnetic material feedstock of claim 1, wherein said one or more rare earth elements are selected from the group consisting of Dy, Pr, Tb, Ce, and Nd.

19. The nanofunctionalized magnetic material feedstock of claim 1, wherein said one or more rare earth elements are alloyed with Cu in the form of a eutectic mixture, and wherein said Cu is not counted toward the concentration of said one or more rare earth elements in said nanofunctionalized magnetic material feedstock.

20. The nanofunctionalized magnetic material feedstock of claim 1, wherein said metal-containing grain-refining nanoparticles are a zirconium-containing material selected from Zr, ZrC, $ZrB_2$, $ZrH_2$, $ZrO_2$, $Zr_2O_3$, or a combination thereof.

21. The nanofunctionalized magnetic material feedstock of claim 1, wherein said nanofunctionalized magnetic material feedstock further comprises a magnetic nanomaterial selected from the group consisting of NdFeB, DyFeB, SmCo, AlNiCo, MnAl, FeN, $Fe_3O_4$, and combinations thereof.

22. The nanofunctionalized magnetic material feedstock of claim 1, wherein said nanofunctionalized magnetic material feedstock further comprises a grain-growth-restriction agent selected from Cu, B, or a combination thereof.

23. The nanofunctionalized magnetic material feedstock of claim 1, wherein said nanofunctionalized magnetic material feedstock further comprises a grain-boundary modifier selected from the group consisting of $Dy_2O_3$, Cu, Nd, and combinations thereof.

24. The nanofunctionalized magnetic material feedstock of claim 1, wherein said nanofunctionalized magnetic material feedstock further comprises an electrical-resistivity modifier selected from the group consisting of $Dy_2O_3$, $Al_2O_3$, $Zr_2O_3$, $ZrO_2$, $Y_2O_3$, $Ce_2O_3$, $CeO_2$, AlN, $SiO_2$, $TiB_2$, TiC, $ZrB_2$, ZrC, and combinations thereof.

25. The nanofunctionalized magnetic material feedstock of claim 1, wherein said nanofunctionalized magnetic material feedstock further contains one or more functional additives.

* * * * *